United States Patent
Shi et al.

(10) Patent No.: US 12,069,520 B2
(45) Date of Patent: Aug. 20, 2024

(54) COMMUNICATIONS METHOD AND RELATED APPARATUS, SYSTEM, AND STORAGE MEDIUM FOR RESOLVING PHYSICAL CELL IDENTIFIER CONFLICTS

(71) Applicant: HUAWEI TECHNOLOGIES CO., LTD., Shenzhen (CN)

(72) Inventors: Xiaoli Shi, Shanghai (CN); Henrik Olofsson, Kista (SE); Hongzhuo Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 394 days.

(21) Appl. No.: 17/400,438

(22) Filed: Aug. 12, 2021

(65) Prior Publication Data

US 2021/0377821 A1   Dec. 2, 2021

Related U.S. Application Data

(63) Continuation of application No. PCT/CN2020/073324, filed on Jan. 20, 2020.

(30) Foreign Application Priority Data

Feb. 13, 2019   (CN) .......................... 201910112807.7

(51) Int. Cl.
  *H04W 36/00*   (2009.01)
  *H04W 16/12*   (2009.01)
  (Continued)

(52) U.S. Cl.
  CPC ....... *H04W 36/0055* (2013.01); *H04W 24/02* (2013.01); *H04W 48/08* (2013.01); *H04W 16/12* (2013.01); *H04W 92/20* (2013.01)

(58) Field of Classification Search
  CPC ..... H04W 16/14; H04W 76/11; H04W 72/02; H04W 72/04; H04W 48/28; H04W 4/40;
  (Continued)

(56) References Cited

U.S. PATENT DOCUMENTS 11,589,250 B2 * 2/2023 Sevindik ............... H04W 16/14
11,844,033 B2 * 12/2023 Chen ................. H04W 72/1268
(Continued)

FOREIGN PATENT DOCUMENTS

CN    101772036 A    7/2010
CN    101778395 A    7/2010
(Continued)

OTHER PUBLICATIONS

H. Yang, A. Huang, R. Gao, T. Chang and L. Xie, "Interference Self-Coordination: A Proposal to Enhance Reliability of System-Level Information in OFDM-Based Mobile Networks via PCI Planning," in IEEE Transactions on Wireless Communications, vol. 13, No. 4, pp. 1874-1887, Apr. 2014. (Year: 2014).*
(Continued)

*Primary Examiner* — William D Cumming
(74) *Attorney, Agent, or Firm* — Rimon PC

(57) ABSTRACT

In a method for resolving PCT conflicts in a new radio (NR) network, synchronization signal and PBCH (Physical Broadcast Channel) blocks (SSB) and corresponding physical cell identifiers (PCIs) are utilized. In the method, a first PCI corresponds to a first SSB and a second PCI corresponds to a second SSB. An access network device determines, based on the first PCI and the second PCT, that the first PCI conflicts with the second PCI. In this way, PCI conflicts in an NR system can be detected to improve the success rate and to reduce the call drop rate in a terminal handover.

20 Claims, 10 Drawing Sheets

(51) Int. Cl.
  *H04W 24/02* (2009.01)
  *H04W 48/08* (2009.01)
  *H04W 92/20* (2009.01)

(58) Field of Classification Search
  CPC .......... H04W 56/001; H04W 56/0045; H04W 72/0453; H04W 72/542; H04W 72/1268
  USPC ........................................................ 370/329
  See application file for complete search history.

(56) References Cited

U.S. PATENT DOCUMENTS

| | | | |
|---|---|---|---|
| 2010/0075681 A1 | 3/2010 | Olofsson et al. | |
| 2015/0304862 A1 | 10/2015 | Nagaraja et al. | |
| 2019/0230530 A1* | 7/2019 | Henriksson | H04W 76/11 |
| 2019/0313271 A1* | 10/2019 | Yiu | H04W 72/04 |
| 2020/0329503 A1* | 10/2020 | Da Silva | H04W 72/02 |
| 2021/0377821 A1* | 12/2021 | Shi | H04W 48/08 |
| 2023/0171713 A1* | 6/2023 | Vikram | H04W 56/001 |
| | | | 370/329 |
| 2023/0188281 A1* | 6/2023 | Yang | H04L 5/0098 |
| | | | 370/329 |
| 2023/0188283 A1* | 6/2023 | Liu | H04W 72/0453 |
| | | | 370/329 |
| 2023/0188293 A1* | 6/2023 | Liu | H04W 56/0015 |
| | | | 370/329 |
| 2023/0239823 A1* | 7/2023 | Liu | H04W 56/0045 |
| | | | 370/350 |
| 2023/0276484 A1* | 8/2023 | Lei | H04W 72/542 |
| | | | 370/329 |
| 2024/0114373 A1* | 4/2024 | Cho | H04B 17/328 |

FOREIGN PATENT DOCUMENTS

| | | | | |
|---|---|---|---|---|
| CN | 101784070 A | | 7/2010 | |
| CN | 103686785 A | | 3/2014 | |
| CN | 105323788 A | | 2/2016 | |
| CN | 106792902 A | | 5/2017 | |
| CN | 109151851 A | | 1/2019 | |
| CN | 110022191 A | * | 7/2019 | .......... H04L 5/0053 |
| CN | 111565398 A | | 8/2020 | |
| EP | 2405682 A2 | | 1/2012 | |
| WO | 2010081855 A1 | | 7/2010 | |
| WO | 2018080359 A1 | | 5/2018 | |
| WO | WO-2020069415 A1 | * | 4/2020 | .......... H04B 7/0408 |
| WO | 2020154993 A1 | | 8/2020 | |

OTHER PUBLICATIONS

Zhao Jun et al., Research on the Impact of PCI Conflict on LTE Networks and Optimization Methods. 2017 Guangdong Communication Youth Forum, May 13, 2017, 5 pages.

Samsung: "Discussion for PCI Confusion", 3GPP Draft; R3-183026, May 20, 2018, XP051445519, total 3 pages.

Nokia, Nokia Shanghai Bell, Signalling of PCI for each SSB over Xn. 3GPP TSG-RAN WG2 Meeting #104, Spokane, USA, Nov. 12-16, 2018, R2-1817050, 4 pages.

* cited by examiner

COMMUNICATIONS METHOD AND RELATED APPARATUS, SYSTEM, AND STORAGE MEDIUM FOR RESOLVING PHYSICAL CELL IDENTIFIER CONFLICTS

CROSS-REFERENCE TO RELATED APPLICATIONS

This application is a continuation of International Patent Application No. PCT/CN2020/073324, filed on Jan. 20, 2020, which claims priority to Chinese Patent Application No. 201910112807.7 filed on Feb. 13, 2019. The disclosures of the aforementioned applications are hereby incorporated by reference in their entireties.

TECHNICAL FIELD

This application relates to the field of communications technologies, and in particular, to a communications method, apparatus, and system, and a storage medium.

BACKGROUND

In a long-term evolution (LTE) system, a physical cell identifier (PCI) is a basic parameter of a wireless cell, and is used to distinguish between different cells. One cell may correspond to one PCI. In the LTE system, there are a large quantity of cells. However, only 504 PCIs are defined in current protocol specifications. Therefore, PCI reuse may occur. When different cells reuse the same PCI, a PCI conflict may occur.

To avoid a PCT conflict or reduce PCI conflicts, PCI conflict detection and reallocation are introduced to the LTE system. Base stations exchange PCI information of cells served by the base stations to detect whether a PCI conflict exists.

However, with rapid development of a 5th generation (5G) network, a beam-related feature is introduced to a new radio (NR) system. The beam-related feature may affect PCI allocation. If the method used in the LTE system to detect the PCI of a cell is in conflict with the PCT of another cell is used in the NR system, the success rate of terminal handover becomes relatively low and the call drop rate becomes relatively high.

SUMMARY

This application provides a communications method, apparatus, and system, and a storage medium, to reduce PCI conflicts and improve a success rate of terminal handover.

According to a first aspect, this application provides a communications method. The method includes: A first access network device determines that a first PCI of a first cell conflicts with a second PCI of a second cell, and the first access network device sends indication information to a second access network device and/or a centralized management node, where the first PCI corresponds to a first synchronization signal and PBCH block (SSB), the second PCI corresponds to a second SSB, the indication information is used to indicate that the first PCI conflicts with the second PCI, and the centralized management node is used to manage the first access network device and the second access network device.

Based on this solution, because an SSB is introduced into an NR system, the first PCI corresponds to the first SSB, and the second PCI corresponds to the second SSB, the first access network device determines, based on the first PCI of the first cell and the second PCI of the second cell, that the first PCI conflicts with the second PCI. In this way, a PCI conflict corresponding to the SSB in the NR system can be detected. This helps eliminate or reduce PCI conflicts in an NR network, improve a success rate of terminal handover, and further reduce a call drop rate.

In a possible case, the first cell corresponds to the first PCI, and the second cell corresponds to the second PCI.

In another possible case, the first cell includes one or more first SSBs. When the first cell includes one first SSB, the first PCI of the first cell is the first PCI corresponding to the first SSB. When the first cell includes a plurality of first SSBs, the first PCI of the first cell may be the first PCI corresponding to one first SSB in the plurality of first SSBs.

Similarly, the second cell may include one or more second SSBs. When the second cell includes one second SSB, the second PCI of the second cell is the second PCI corresponding to the second SSB. When the second cell includes a plurality of second SSBs, the second PCI of the second cell may be the second PCI corresponding to one second SSB in the plurality of second SSBs.

Optionally, the first cell belongs to the first access network device, and the second cell belongs to the second access network device. For example, the first access network device is a primary node, the first cell is a cell managed by the primary node, the second access network device is a secondary node, and the second cell is a cell managed by the secondary node. For another example, the first access network device and the second access network device are different nodes (for example, base stations), and the first cell and the second cell are managed by different nodes. For another example, the first access network device and the second access network device are different central units (central unit, CU), and the first cell and the second cell are managed by different CUs.

Optionally, both the first cell and the second cell belong to the first access network device. For example, the first access network device is a primary node, the second access network device is a secondary node, and the first cell and the second cell are different cells managed by the primary node. For another example, the first access network device is a base station, and the first cell and the second cell are different cells managed by the base station.

Optionally, both the first cell and the second cell belong to the second access network device. For example, the first access network device is a CU, the second access network device is a distributed unit (DU), and the first cell and the second cell are different cells managed by the DU. For another example, the first access network device is a primary node, the second access network device is a secondary node, and the first cell and the second cell are different cells managed by the secondary node. For another example, the second access network device is a base station, and the first cell and the second cell are different cells managed by the base station.

Optionally, the first cell belongs to the second access network device, and the second cell belongs to a third access network device, where the first access network device manages the second access network device and the third access network device. For example, the first access network device is a CU, the second access network device and the third access network device are different DUs managed by the CU, and the first cell and the second cell are managed by different DUs.

In a possible implementation, the first access network device obtains SSB information corresponding to the first cell and SSB information corresponding to the second cell, where the SSB information corresponding to the first cell includes the first PCI, and the SSB information corresponding to the second cell includes the second PCI.

In another possible implementation, the SSB information corresponding to the first cell further includes a frequency corresponding to the first SSB, and the SSB information corresponding to the second cell further includes a frequency corresponding to the second SSB.

In still another possible implementation, the SSB information corresponding to the first cell may further include a type of the first SSB, the SSB information corresponding to the second cell may further include a type of the second SSB, and the type of the SSB (the first SSB or the second SSB) is a cell-defining synchronization signal and PBCH block (cell-defining SSB, CD-SSB) or a non cell-defining synchronization signal and PBCH block (non cell defining SSB, non CD-SSB). In this way, the first access network device may detect, based on the type of the second SSB, a conflict type of the first PCI and the second PCI that conflict with each other, and may preferentially modify a PCI corresponding to the non CD-SSB. This helps reduce an impact of PCI modification on access of a terminal device to an access network device.

Based on the foregoing SSB information, in a possible implementation, when determining that the first SSB is adjacent to the second SSB, the frequency corresponding to the first SSB is the same as the frequency corresponding to the second SSB, and the first PCI is the same as the second PCI, the first access network device may determine that the first PCI conflicts with the second PCI.

In another possible implementation, the SSB information corresponding to the second cell may further include one or more MTCs (measurement timing configuration) corresponding to the second SSB, an SCS (sub-carrier spacing) corresponding to the second SSB, and an SSB occasion corresponding to the second SSB. The SSB information corresponding to the first cell may further include one or more MTCs corresponding to the first SSB, an SCS corresponding to the first SSB, and an SSB occasion corresponding to the first SSB.

Based on the SSB information in the other possible implementation, when determining that the first SSB is adjacent to the second SSB, the frequency and/or the measurement timing configuration (MTC) and/or the subcarrier spacing (SCS) and/or the SSB occasion (SSB occasion) corresponding to the first SSB are/is respectively the same as the frequency and/or the MTC and/or the SCS and or the SSB occasion corresponding to the second SSB, and the first PCI corresponding to the first SSB is the same as the second PCI corresponding to the second SSB, the first access network device may determine that the first PCI conflicts with the second PCI.

That the frequency and/or the MTC and/or the SCS and/or the SSB occasion corresponding to the first SSB are/is respectively the same as the frequency and/or the MTC and/or the SCS and or the SSB occasion corresponding to the second SSB specifically means that the frequency corresponding to the first SSB is the same as the frequency corresponding to the second SSB, the MTC corresponding to the first SSB is the same as the MTC corresponding to the second SSB, the SCS corresponding to the first SSB is the same as the SCS corresponding to the second SSB, and the SSB occasion corresponding to the first SSB is the same as the SSB occasion corresponding to the second SSB.

That the first SSB is adjacent to the second SSB includes two cases. Case 1: The first SSB is directly adjacent to the second SSB. Case 2: The first SSB and the second SSB are directly adjacent to a third SSB. In Case 2, it may also be referred to as that the first SSB is indirectly adjacent to the second SSB.

In a possible implementation, the indication information includes one or more selected from: the second PCI, the frequency corresponding to the second SSB, the type of the second SSB, the MTC corresponding to the second SSB, the SCS corresponding to the second SSB, the SSB occasion corresponding to the second SSB, and an NCGI corresponding to the second SSB.

For example, the indication information may include the second PCI. Alternatively, the indication information may include the second PCI and the type of the second SSB. Alternatively, the indication information may include the second PCI and the frequency corresponding to the second SSB. Alternatively, the indication information may include the second PCI, the type of the second SSB, and the frequency corresponding to the second SSB. Alternatively, the indication information may further include another possible combination manner. This is not limited in this application. A PCI that needs to be modified may be determined based on the content of the indication information.

In a possible implementation, the first access network device may be a CU, the second access network device and the third access network device may be DUs, the CU corresponds to at least one DU, the CU supports at least one protocol stack function selected from: a protocol stack function of a packet data convergence protocol (PDCP), a protocol stack function of radio resource control (RRC), and a protocol stack function of a service data adaptation protocol (SDAP), and the DU supports at least one the following: a protocol stack function of radio link control (RLC), a protocol stack function of medium access control (MAC), and a protocol stack function of a physical layer (PHY). In this case, the first access network device may send the indication information to the second access network device through an F1 interface.

In another possible implementation, the first access network device may be a primary node, the second access network device may be a secondary node, and one primary node corresponds to at least one secondary node. Based on different network architectures, the first access network device sends the indication information to the second access network device through different interfaces. For example, the first access network device may send the indication information to the second access network device through an Xn interface, or send the indication information to the second access network device through an X2 interface.

In a possible implementation, the first access network device may modify the first PCI and/or the second PCI, so that a modified PCI corresponding to the first SSB does not conflict with the second PCI.

Further, to improve efficiency of modifying, by the first access network device, the first PCI and/or the second PCI, the first access network device may obtain range information of the first PCI and/or range information of the second PCI, where the range information of the first PCI is a range of an available PCI of the first cell, and the range information of the second PCI is a range of an available PCI of the second cell.

When the first cell includes one first SSB, the range of the available PCI of the first cell is a range of an available PCI of the first SSB. When the first cell includes a plurality of first SSBs, the range of the available PCI of the first cell is a range of an available PCI of each first SSB in the plurality of first SSBs. Correspondingly, when the second cell includes one second SSB, the range of the available PCI of the second cell is a range of an available PCI of the second SSB. When the second cell includes a plurality of second SSBs, the range of the available PCI of the second cell is a range of an available PCI of each second SSB in the plurality of second SSBs.

In a possible implementation, the first access network device may maintain an available PCI set, and the first access network device may use any PCI in the PCI set. In this way, the first access network device may select one available PCI from the maintained PCI set to replace the first PCI and/or the second PCI, and the second access network device does not need to request an available PCI from OAM. This helps improve efficiency of modifying a PCI that conflicts with another PCI.

In a possible implementation, the centralized management node may be an operation, administration, and maintenance (OAM) device.

According to a second aspect, this application provides a communications method. The method includes: A second access network device receives indication information from a first access network device, and modifies a second PCI based on the indication information. The indication information is used to indicate that a first PCI of a first cell conflicts with the second PCI of a second cell, the first PCI corresponds to a first SSB, and the second PCI corresponds to a second SSB.

Based on this solution, because an SSB is introduced into an NR system, the first PCI corresponds to the first SSB, the second PCI corresponds to the second SSB, and the indication information received by the second access network device is used to indicate that the first PCI conflicts with the second PCI, the second access network device may modify the second PCI based on the indication information, so that a modified PCI corresponding to the second SSB does not conflict with the first PCI. This helps eliminate or reduce a PCI conflict in an NR network, improve a success rate of terminal handover, and further reduce a call drop rate.

In a possible implementation, the first cell belongs to the first access network device, and the second cell belongs to the second access network device; both the first cell and the second cell belong to the first access network device; both the first cell and the second cell belong to the second access network device; or the first cell belongs to the second access network device, and the second cell belongs to a third access network device, where the first access network device manages the second access network device and the third access network device.

In a possible implementation, the second access network device may send the indication information to a centralized management node, so that the centralized management node modifies the second PCI or the first PCI based on the indication information.

In a possible implementation, the second access network device sends, to the first access network device, SSB information corresponding to the second cell, where the SSB information corresponds to the second cell includes the second PCI, and the second cell belongs to the second access network device.

In a possible implementation, the second access network device may determine the second SSB based on the indication information and modify the second PCI corresponding to the second SSB.

In a possible implementation, the second access network device may maintain an available PCI set, and the second access network device may use any PCI in the PCI set. In this way, the second access network device may select one available PCI from the maintained PCI set to replace the second PCI without requesting an available PCI from OAM. This helps improve efficiency of modifying a PCI that conflicts with another PCI.

In a possible implementation, the SSB information corresponding to the second cell further includes a frequency corresponding to the second SSB and/or a type of the second SSB, and the type of the second SSB is a CD-SSB or a non CD-SSB.

In a possible implementation, the indication information includes the second PCI and the type of the second SSB. In another possible implementation, the indication information includes the second PCI and the frequency corresponding to the second SSB. In another possible implementation, the indication information includes the second PCI, the type of the second SSB, and the frequency corresponding to the second SSB.

In a possible implementation, the first access network device is a CU, the second access network device and the third access network device are DUs, the CU corresponds to at least one DU, the CU supports at least one of a protocol stack function of a PDCP, a protocol stack function of RRC, and a protocol stack function of a SDAP, and the DU supports at least one of a protocol stack function of RLC, a protocol stack function of MAC, and a protocol stack function of a PHY. In this case, the second access network device receives the indication information from the first access network device through an F1 interface.

In another possible implementation, the first access network device is a primary node, the second access network device is a secondary node, and one primary node corresponds to at least one secondary node. In this scenario, two cases are existed. Case 1: The second access network device may receive the indication information from the first access network device through an Xn interface. Case 2: The second access network device may receive the indication information from the first access network device through an X2 interface.

According to a third aspect, an embodiment of this application provides a communications method. The method includes: A first access network device obtains range information of a first PCI and/or range information of a second PCI; and modifies the first PCI based on the range information of the first PCI, and/or modifies the second PCI based on the range information of the second PCI. The range information of the first PCI is a range of an available PCI of a first cell, and the range information of the second PCI is a range of an available PCI of a second cell.

Based on this solution, the first access network device may modify a PCI that conflicts with another PCI based on the obtained range information of the PCI. This helps improve efficiency of PCI modification.

That a first access network device obtains range information of a first PCI and/or range information of a second PCI may include the following four cases.

Case 1: When the first cell belongs to the first access network device, and the second cell belongs to a second access network device, the first access network device may locally obtain the range information of the first PCI, and the first access network device may obtain the range information of the second PCI from the second access network device.

In a possible implementation, the range information of the first PCI may be determined by the first access network device, or may be sent to the first access network device after being determined by OAM of the first access network device. The range information of the second PCI may be determined by the second access network device, or may be sent to the second access network device after being determined by OAM of the second access network device.

Case 2: When both the first cell and the second cell belong to the first access network device, the first access network device may locally obtain the range information of the first PCI and the range information of the second PCI.

In a possible implementation, both the range information of the first PCI and the range information of the second PCI may be determined by the first access network device, or may be sent to the first access network device after being determined by the OAM of the first access network device.

Case 3: When both the first cell and the second cell belong to the second access network device, the first access network device may obtain, from the second access network device, the range information of the first PCI and the range information of the second PCI.

In a possible implementation, both the range information of the first PCI and the range information of the second PCI may be determined by the second access network device, or may be sent to the second access network device after being determined by the OAM of the second access network device.

Case 4: When the first cell belongs to the second access network device, and the second cell belongs to a third access network device, the first access network device may obtain the range information of the first PCI from the second access network device, and obtain the range information of the second PCI from the third access network device, where the first access network device manages the second access network device and the third access network device.

In a possible implementation, the range information of the first PCI may be determined by the second access network device, or may be sent to the second access network device after being determined by the OAM of the second access network device. The range information of the second PCI may be determined by the third access network device, or may be sent to the third access network device after being determined by OAM of the third access network device.

In a possible implementation, the first access network device may be a CU, and the second access network device may be a DU.

According to a fourth aspect, an embodiment of this application provides a communications apparatus. The communications apparatus is configured to implement the method performed by the first access network device and/or the second access network device in the foregoing embodiments. The function may be implemented by hardware, or may be implemented by hardware by executing corresponding software. The hardware or the software includes one or more units or modules corresponding to the foregoing function.

In a possible design, the communications apparatus includes a processor, and the processor is configured to support the communications apparatus to execute a corresponding function of the access network device in the foregoing communications method. The communications apparatus further includes a memory, and the memory may be coupled to the processor, and stores program instructions and data that are necessary for the communications apparatus. Optionally, the communications apparatus further includes a transceiver, and the transceiver is configured to support communication between the communications apparatus and a network element such as a relay device or an access network device. The transceiver may be an independent receiver, an independent transmitter, a transceiver integrated with a transceiver function, or an interface circuit.

In a possible implementation, the communications apparatus may be an access network device, or a component that can be used for an access network device, for example, a chip, a chip system, or a circuit.

According to a fifth aspect, an embodiment of this application provides a communications apparatus, configured to implement the method in any one of the first aspect or the possible implementations of the first aspect, the method in any one of the second aspect or the possible implementations of the second aspect, or the method in any one of the third aspect or the possible implementations of the third aspect. The apparatus includes corresponding function modules, respectively configured to implement the steps in the foregoing method. The function may be implemented by hardware, or may be implemented by hardware by executing corresponding software. The hardware or software includes one or more modules corresponding to the functions.

In a possible implementation, a structure of the communications apparatus includes a processing unit and a transceiver unit. The units may execute corresponding functions in the above method examples. For details, refer to detailed descriptions in the method examples. Details are not described herein again.

According to a sixth aspect, an embodiment of this application provides a communications system. The communications system includes a first access network device and a second access network device. The first access network device may be configured to perform the method in any one of the first aspect or the possible implementations of the first aspect, and the second access network device may be configured to perform the method in any one of the second aspect or the possible implementations of the second aspect, or the method in any one of the third aspect or the possible implementations of the third aspect.

According to a seventh aspect, an embodiment of this application provides a computer-readable storage medium. The computer-readable storage medium stores instructions. When the instructions are run on a computer, the computer is enabled to perform the method in any one of the first aspect or the possible implementations of the first aspect, the method in any one of the second aspect or the possible implementations of the second aspect, or the method in any one of the third aspect or the possible implementations of the third aspect.

According to an eighth aspect, an embodiment of this application provides a computer program product including instructions. When the instructions are run on a computer, the computer is enabled to perform the method in any one of the first aspect or the possible implementations of the first aspect, the method in any one of the second aspect or the possible implementations of the second aspect, or the method in any one of the third aspect or the possible implementations of the third aspect.

DESCRIPTION OF EMBODIMENTS

In embodiments, claims, and the accompanying drawings of this specification in this application, terms "first", "second", and the like are intended to distinguish between similar objects, but do not necessarily indicate a specific order or sequence.

It should be understood that, in this application, "at least one" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

Figure 1:
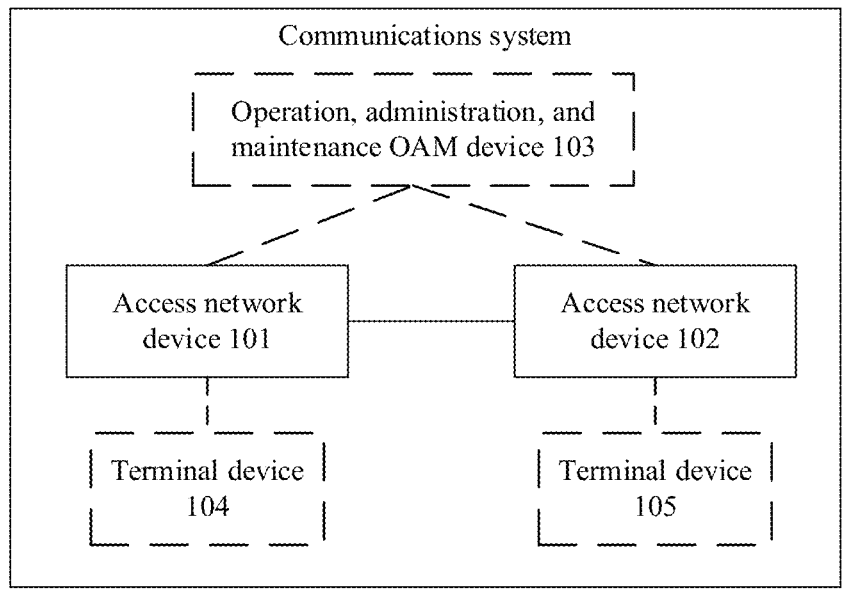
FIG. 1 is a schematic architectural diagram of a communications system according to this application.

FIG. 1 shows an example of a schematic architectural diagram of a communications system according to this application. The communications system may include an access network device. Optionally, a centralized management node and a terminal device may further be included. The centralized management node may be an OAM device, and may be configured to manage the access network device. For ease of description, the following embodiments are described by using an example in which the centralized node is an OAM device. In FIG. 1, the following is described by using an example in which the communications system includes an access network device 101, an access network device 102, an OAM device 103, a terminal device 104, and a terminal device 105. As shown in FIG. 1, the terminal device 104 accesses the access network device 101, and the terminal device 105 accesses the access network device 102. The access network device 101 and the access network device 102 each may include at least one cell, and one cell may include one or more SSBs. Different SSBs may correspond to a same PCI, or may correspond to different PCIs. The access network device 101 and the access network device 102 may exchange respective cell information and/or SSB information of a cell through an interface message.

The communications system in this application may be a universal mobile telecommunications system (UMTS), a global system for mobile communications (GSM), an enhanced data rates for GSM evolution (EDGE) system, a long-term evolution LTE) wireless communications system, a 5th generation (5G) mobile communications system such as an NR system, another communications system such as a public land mobile network (PLMN) system, or another communications system that may appear in the future. This is not limited in this application.

An access network device may also be referred to as a radio access network device, and is a device configured to enable a terminal device to access a wireless network. The access network device may be an access network device in various communications systems, for example, a NodeB (nodeB) in the UMTS, a macro base station eNB in the LTE wireless communications system, a base station device such as a gNB or a transmission reception point (TRP) in the 5G mobile communications system, or a baseband processing unit pool (building base band unit pool, BBU pool) in C-RAN networking. Alternatively, the access network device may be a radio network controller (RNC), a base station controller (BSC), a base transceiver station (BTS), or a home base station (for example, a home evolved NodeB, or a home NodeB, HNB). Alternatively, the access network device may be a CU or a DU in a distributed base station scenario. The CU supports at least one of a protocol stack function of a PDCP, a protocol stack function of RRC, and a protocol stack function of a SDAP. Alternatively, the CU supports some functions of at least one of a protocol stack function of a PDCP, a protocol stack function of RRC, and a protocol stack function of a SDAP. It should be noted that a protocol stack function supported by the CU may change. This is not limited in this application. The DU supports at least one of a protocol stack function of RLC, a protocol stack function of MAC, and a protocol stack function of a PHY. Alternatively, the DU supports some functions of at least one of a protocol stack function of RLC, a protocol stack function of MAC, and a protocol stack function of a PHY. It should be noted that a protocol stack function supported by the DU may change. This is not limited in this application.

For example, when the CU is connected to a 5GC network, the CU may support the protocol stack function of the PDCP, the protocol stack function of the RRC, and the protocol stack function of the SDAP. When connected to an evolved packet core (EPC) network, the CU supports the protocol stack function of the PDCP and the protocol stack function of the RRC.

It should be noted that the CU and the DU may be two physically or logically separated modules in an entire access network device, or may be two completely independent logical network elements.

A terminal device may also be referred to as a terminal, or user equipment (user equipment, UE). The terminal device may be a handheld device with a wireless connection function, a vehicle-mounted device, a road side infrastructure with a communication function, or the like. For example, the terminal device may be a mobile phone, a tablet, a laptop computer, a palmtop computer, a mobile internet device (MID), a wearable device, or an unmanned aerial vehicle device, where the wearable device includes, for example, a smart watch, a smart band, and a pedometer.

Based on the architecture of the communications system shown in FIG. 1, this application provides the following three possible scenarios.

Scenario 1: NR Standalone (SA) Networking Architecture

Figure 1A:
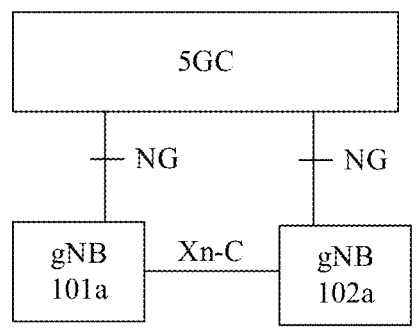
FIG. 1a is a schematic diagram of an NR SA networking architecture according to this application.

FIG. 1a is a schematic diagram of the NR SA networking architecture according to this application. In this architecture, a gNB 101a and a gNB 102a may be connected to the 5G core network (5GC) through an NG interface, and the gNB 101a may be connected to the gNB 102a through an Xn interface (which is also referred to as an Xn-control plane (Xn-C) interface). In a possible case, the gNB 101a may be the access network device 101 in FIG. 1, and the gNB 102a may be the access network device 102 in FIG. 1.

Figure 1B:
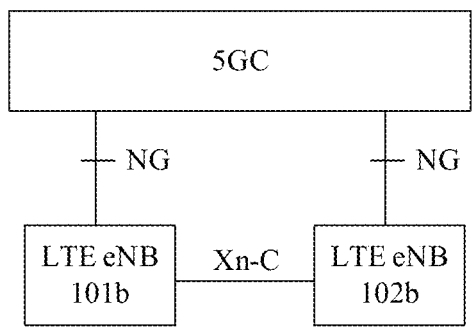
FIG. 1b is a schematic diagram of another NR SA networking architecture according to this application.

FIG. 1b is a schematic diagram of another NR SA networking architecture according to this application. In this architecture, an LTE evolved NodeB (eNB) 101b and an LTE eNB 102b may be connected to the 5G core network through an NG interface, and the LTE eNB 101b may be connected to the LTE eNB 102b through an X2-C interface. In a possible case, the LTE eNB 101b may be the access network device 101 in FIG. 1, and the LTE eNB 102b may be the access network device 102 in FIG. 1.

Scenario 2: Multi-Connectivity Data Transmission Architecture (Which May Also Be Referred to as a Primary-Secondary Node Architecture)

It should be noted that Scenario 2 may further be divided into the following two network architectures.

Figure 1C:
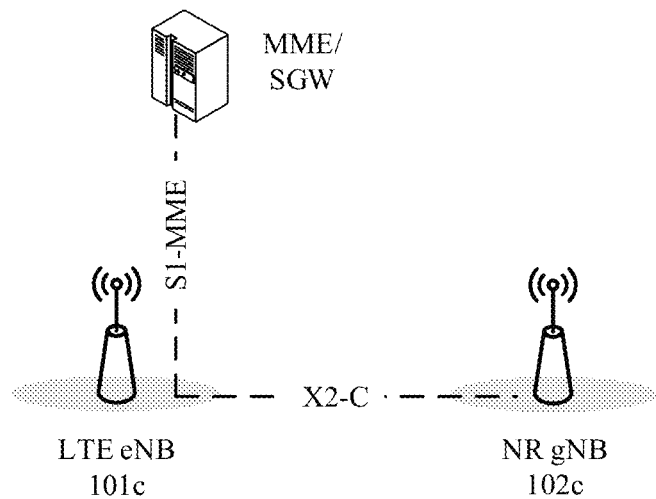
FIG. 1c is a schematic diagram of an EN-DC architecture according to this application.

Network Architecture 1: Evolved Universal Terrestrial Radio Access Network and NR Dual Connectivity (E-UTRA-NR Dual Connectivity, EN-DC) Network Architecture FIG. 1c is a schematic diagram of the EN-DC architecture according to this application. In this architecture, a primary node may be an LTE eNB 101c, and a secondary node is an NR gNB 102c, where the LTE eNB 101c may also be referred to as an anchor base station. The LTE eNB 101c may be connected to an MME or a serving gateway (SGW) in a 4G core network through an S1-mobility management entity (S1-MME) interface, and the LTE eNB 101c may be connected to the NR gNB 102c through an X2-C interface. In a possible case, the LTE eNB 101c may be the access network device 101 in FIG. 1, and the NR gNB 102c may be the access network device 102 in FIG. 1.

Network Architecture 2: Multi-Radio Dual Connectivity (MR-DC) Network Architecture Network architecture 2 may be divided into the following two possible cases.

Case 1: A core network connected to a primary node and a secondary node is an EPC (which may also be referred to as an EN-DC architecture).

For Case 1, refer to the description of the EN-DC architecture shown in FIG. 1c. Details are not described herein again.

Case 2: A core network connected to a primary node and a secondary node is the 5GC network.

Case 2 may further be divided into the following two cases (that is, Case 2.1 and Case 2.2).

Case 2.1: The primary node is an NR gNB 101d and the secondary node is an NG eNB 102d.

Figure 1D:
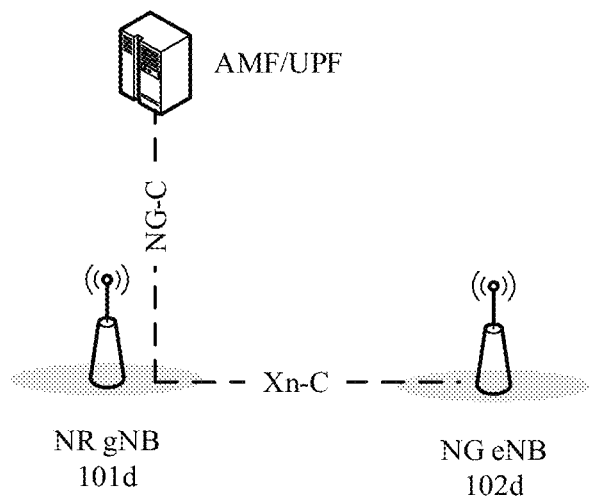
FIG. 1d is a schematic diagram of an MR-DC architecture according to this application.

FIG. 1d is a schematic diagram of an MR-DC architecture according to this application. In this architecture, the primary node is the NR gNB 101d, and the secondary node is the NG eNB 102d, where the NR gNB 101d may also be referred to as an anchor base station. The NR gNB 101d is connected to an access and mobility management function (AMF) network element or a user plane function (UPF) network element in the 5G core network through an NG-C interface, and the NR gNB 101d may be connected to the NG eNB 102d through an Xn-C interface.

Case 2.2: The primary node is an NG eNB 101f and the secondary node is an NR gNB 102f.

Figure 1E:
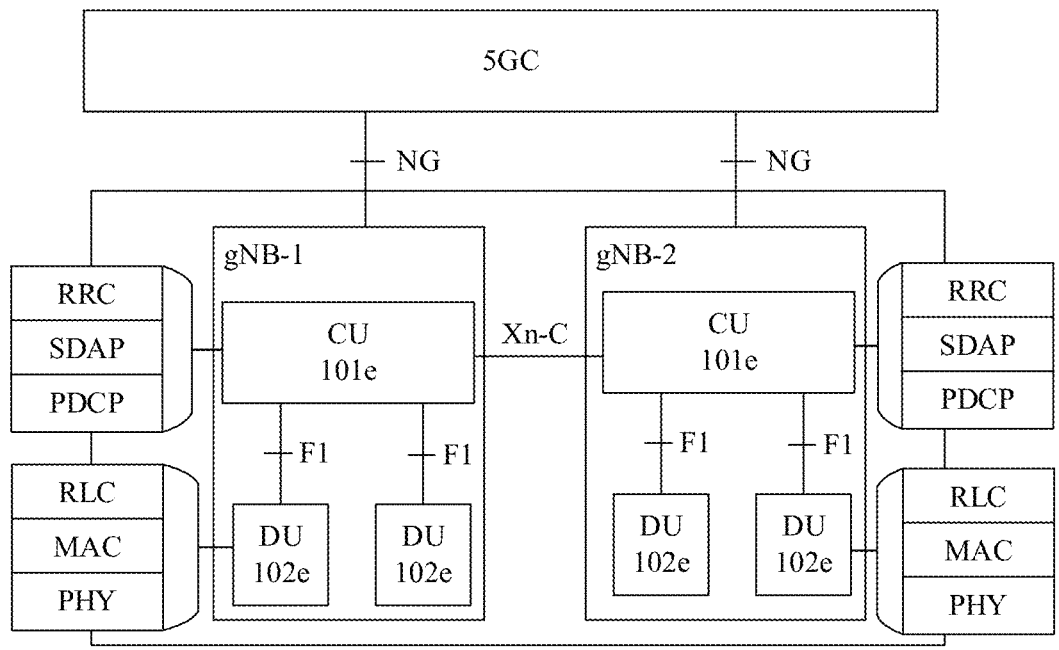
FIG. 1e is a schematic diagram of a CU-DU architecture of NR according to this application.
Figure 1F:
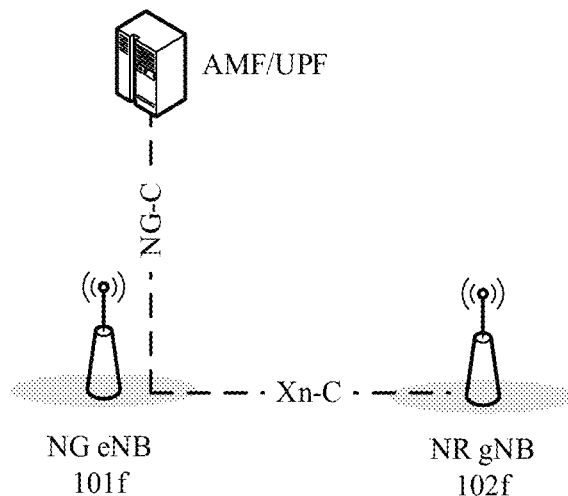
FIG. 1f is a schematic diagram of another MR-DC architecture according to this application.

FIG. 1f is a schematic diagram of another MR-DC architecture according to this application. In this architecture, the primary node is the NG eNB 101f, and the secondary node is the NR gNB 102f, where the NG eNB 101f may also be referred to as an anchor base station. The NG eNB 101f is connected to an AMF network element in the 5G core network through an NG-C interface, and the NR gNB 102f may be connected to the NG eNB 101f through an Xn-C interface.

Scenario 3: CU-DU Architecture

In this architecture, a CU corresponds to at least one DU, where the architecture may be a CU-DU architecture of LTE, or may be a CU-DU architecture of NR. FIG. 1e is a schematic diagram of the CU-DU architecture of NR according to this application. The following is described by using an example in which the architecture includes a gNB-1 and a gNB-2, the gNB-1 includes one CU 101e and two DUs 102e, and the gNB-2 also includes one CU 101e and two DUs 102e. The gNB-1 and the gNB-2 may be a same gNB. The CU 101e in the gNB-1 may be connected to the CU 101e in the gNB-2 through an Xn-C interface, the CU 101e in the gNB-1 may be connected to the two DUs 102e through an F1 interface respectively, and the CU 101e in the gNB-2 may be connected to the two DUs 102e through the F1 interface respectively.

Scenario 3 may be divided into the following three cases.

Case 1: The CU 101e in the gNB-1 may be the access network device 101 in FIG. 1, and the DU 102e in the gNB-1 may be the access network device 102 in FIG. 1.

Case 2: The CU 101e in the gNB-1 may be the access network device 101 in FIG. 1, and the DU 102e in the gNB-2 may be the access network device 102 in FIG. 1.

Case 3: The CU 101e in the gNB-1 may be the access network device 101 in FIG. 1, and the CU 101e in the gNB-2 may be the access network device 102 in FIG. 1.

Before a method in this application is described, application scenarios in this application are first further described, to facilitate understanding of this solution. It should be noted that this part of content is also used as a part of optional content of this application.

In a possible implementation, one access network device may include one or more cells, and each cell may correspond to one PCI. Further, one cell may correspond to one or more SSBs. When one cell corresponds to one SSB, a PCI of the cell is a PCI corresponding to the SSB in the cell. Alternatively, it may be understood that a PCI corresponding to an SSB is a PCI of a cell to which the SSB belongs. When one cell corresponds to a plurality of SSBs, one SSB corresponds to one PCI, and a PCI of the cell is a PCI corresponding to one SSB in the plurality of SSBs. In a possible implementation, one SSB may alternatively be considered as one virtual cell. In other words, one virtual cell corresponds to one PCI.

In a possible implementation, one SSB corresponds to one frequency. In a frequency range of a carrier of the access network device, a plurality of SSBs may be transmitted. PCIs of SSBs transmitted at different frequency locations may not be unique. For example, SSBs at different frequency locations may have different PCIs. When the SSB is associated with remaining minimum system information (RMSI), the SSB may correspond to an independent cell, and has a unique NR cell global identifier (NCGI). The SSB with the unique NCGI may be referred to as a CD-SSB. In another possible implementation, when one cell may correspond to a plurality of SSBs, the plurality of SSBs may be divided into a CD-SSB or a non CD-SSB based on whether the SSB has a corresponding NCGI. The SSB with a corresponding NCGI may be referred to as a CD-SSB, the SSB without a corresponding NCGI may be referred to as a non CD-SSB, and one cell may include one CD-SSB and at least one non CD-SSB. The CD-SSB or the non CD-SSB is also referred to as a type of the SSB.

For example, in this application, different access network devices are shown as a first access network device, a second access network device, and a third access network device. For example, in a CU-DU scenario, the first access network device may be a CU, and the second access network device and the third access network device are different DUs managed by the CU. For another example, in an MR-DC scenario, the first access network device may be a primary node, and the second access network device/the third access network device is a secondary node.

For example, in this application, cells in which PCI conflicts occur are referred to as a first cell and a second cell, any SSB in the first cell is referred to as a first SSB, and a PCI corresponding to the first SSB is referred to as a first PCI. Any SSB in the second cell is referred to as a second SSB, and a PCI corresponding to the second SSB is referred to as a second PCI. It may be understood that, in different networking scenarios, the first cell and the second cell correspond to different access network devices. For example, in the CU-DU scenario, the first cell belongs to the second access network device, and the second cell belongs to the third access network device. In the MR-DC scenario, the first cell belongs to the first access network device, and the second cell belongs to the second access network device/the third access network device.

In this application, that the first PCI of the first cell conflicts with the second PCI of the second cell may be defined as follows:

The first cell is adjacent to the second cell, a frequency corresponding to the first cell is the same as a frequency corresponding to the second cell, and a PCI of the first cell is the same as a PCI of the second cell. That the first cell is adjacent to the second cell includes that the first cell is directly adjacent to the second cell, or the first cell and the second cell are directly adjacent to a third cell, and the first cell is not directly adjacent to the second cell. In this case, the first cell is indirectly adjacent to the second cell.

In this application, based on the first SSB in the first cell and the second SSB in the second cell, that the first PCI corresponding to the first SSB conflicts with the second PCI corresponding to the second SSB may be defined as follows:

A possible definition is as follows: The first SSB is adjacent to the second SSB, the frequency corresponding to the first SSB is the same as the frequency corresponding to the second SSB, and the first PCI is the same as the second PCI.

Figure 2:
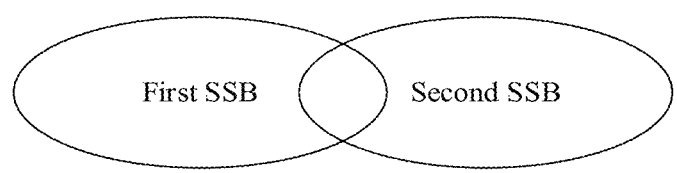
FIG. 2 is a schematic diagram in which a first SSB is directly adjacent to a second SSB according to this application.
Figure 2A:
FIG. 2a is a schematic diagram in which a first SSB is indirectly adjacent to a second SSB according to this application.

In this application, that the first SSB is adjacent to the second SSB includes that the first SSB is directly adjacent to the second SSB, or the first SSB and the second SSB are directly adjacent to a third SSB, and the first SSB is not directly adjacent to the second SSB. In this case, the first SSB is indirectly adjacent to the second SSB. Optionally, direct adjacency includes geographical adjacency and/or overlap of signal coverage areas. FIG. 2 is a schematic diagram in which the first SSB is directly adjacent to the second SSB according to this application. FIG. 2a is a schematic diagram in which the first SSB is indirectly adjacent to the second SSB according to this application. The first SSB is directly adjacent to the third SSB, the second SSB is directly adjacent to the third SSB, and the first SSB is not directly adjacent to the second SSB.

Another possible definition is as follows: The first SSB is adjacent to the second SSB, the frequency and/or a measurement timing configuration (MTC) and/or a subcarrier spacing (SCS) and/or an SSB occasion corresponding to the first SSB are/is respectively the same as the frequency and/or an MTC and/or an SCS and or an SSB occasion corresponding to the second SSB, and the first PCI corresponding to the first SSB is the same as the second PCI corresponding to the second SSB.

That the frequency and/or an MTC and/or an SCS and/or an SSB occasion corresponding to the first SSB are/is respectively the same as the frequency and/or an MTC and/or an SCS and or an SSB occasion corresponding to the second SSB specifically means that the frequency corresponding to the first SSB is the same as the frequency corresponding to the second SSB, and/or the MTC corresponding to the first SSB is the same as the MTC corresponding to the second SSB, and/or the SCS corresponding to the first SSB is the same as the SCS corresponding to the second SSB, and/or the SSB occasion corresponding to the first SSB is the same as the SSB occasion corresponding to the second SSB. The frequency and/or the MTC and/or the SCS and/or the SSB occasion corresponding to the first SSB may be represented as the following possible combinations: the frequency corresponding to the first SSB, the MTC corresponding to the first SSB, the SCS corresponding to the first SSB, the SSB occasion corresponding to the first SSB, the frequency and the MTC corresponding to the first SSB, the frequency and the SCS corresponding to the first SSB, the frequency and the SSB occasion corresponding to the first SSB, the MTC and the SCS corresponding to the first SSB, the MTC and the SSB occasion corresponding to the first SSB, the SCS and the SSB occasion corresponding to the first SSB, and the frequency, the MTC, the SCS, and the SSB occasion corresponding to the first SSB. Similarly, the frequency and/or the MTC and/or the SCS and/or the SSB occasion corresponding to the second SSB also have/has a plurality of possible combinations. For the combinations, refer to the combinations of the first SSB. Details are not described herein again.

It should be noted that a PCI conflict between directly adjacent SSBs is referred to as a PCI collision, and a PCI conflict between indirectly adjacent SSBs may also be referred to as PCI confusion. A specific name is not limited herein in this application. Direct adjacency may be understood as that all cells that can be measured by a terminal device are directly adjacent, and indirect adjacency may be understood as that a cell measured by the terminal device is indirectly adjacent to a neighbor cell of a serving cell.

This application provides the following two implementations to determine that the first SSB is (directly and indirectly) adjacent to the second SSB.

Implementation 1: If the cell to which the first SSB belongs is adjacent to the cell to which the second SSB belongs, it is determined that the first SSB is adjacent to the second SSB.

For example, information exchanged between the first access network device and the second access network device may include a serving cell and a neighbor cell of the serving cell. For example, the serving cell is a cell 1 of the second access network device, and neighbor cells of the serving cell are a cell 2 and a cell 3. After receiving an information element sent by the second access network device, the first access network device may determine that an SSB included in a cell of the first access network device is directly adjacent to an SSB included in the cell 1, and the SSB included in the cell of the first access network device is indirectly adjacent to an SSB included in the cell 2 and an SSB included in the cell 3. In this example, the SSB may be a CD-SSB, or may be a non CD-SSB.

Implementation 2: The access network device may define an information element, and the information element is used to indicate an SSB directly adjacent to a serving SSB (for example, the second SSB). The information that is sent by the second access network device and that is received by the first access network device includes the defined information element. It may be determined, based on the defined information element, that an SSB directly adjacent to the serving SSB (for example, the second SSB), and an SSB indirectly adjacent to the serving SSB. In this example, the serving SSB may be a CD-SSB, or may be a non CD-SSB. The SSB adjacent to the serving SSB may be a CD-SSB, or may be a non CD-SSB.

Based on that the SSB may be divided into a CD-SSB or a non CD-SSB, that the first PCI conflicts with the second PCI may be divided into the following three cases. Case A: PCI conflict between CD-SSBs In this case, the first SSB is a first CD-SSB, and the second SSB is a second CD-SSB. Based on whether the first CD-SSB is directly adjacent to or indirectly adjacent to the second CD-SSB, there may be Case A-1 and Case A-2.

Case A-1: PCI Collision Between the CD-SSBs

The first CD-SSB is directly adjacent to the second CD-SSB, a frequency and/or an MTC and/or an SCS and/or an SSB occasion corresponding to the first CD-SSB are/is respectively the same as a frequency and/or an MTC and/or an SCS and or an SSB occasion corresponding to the second CD-SSB, and the first PCI corresponding to the first CD-SSB is the same as the second PCI corresponding to the second CD-SSB.

Case A-2: PCI Confusion Between the CD-SSBs

The first CD-SSB is indirectly adjacent to the second CD-SSB, a frequency and/or an MTC and/or an SCS and/or an SSB occasion corresponding to the first CD-SSB are/is respectively the same as a frequency and/or an MTC and/or an SCS and or an SSB occasion corresponding to the second CD-SSB, and the first PCI corresponding to the first CD-SSB is the same as the second PCI corresponding to the second CD-SSB.

Case B: PCI Conflict Between Non CD-SSBs

In this case, the first SSB is a first non CD-SSB, and the second SSB is a second non CD-SSB. Based on whether the first non CD-SSB is directly adjacent to or indirectly adjacent to the second non CD-SSB, there may be Case B-1 and Case B-2.

Case B-1: PCI Collision Between the Non CD-SSBs

The first non CD-SSB is directly adjacent to the second non CD-SSB, a frequency and/or an MTC and/or an SCS and/or an SSB occasion corresponding to the first non CD-SSB are/is respectively the same as a frequency and/or an MTC and/or an SCS and or an SSB occasion corresponding to the second non CD-SSB, and the first PCI corresponding to the first non CD-SSB is the same as the second PCI corresponding to the second non CD-SSB.

Case B-2: PCI Confusion Between the Non CD-SSBs

The first non CD-SSB is indirectly adjacent to the second non CD-SSB, a frequency and/or an MTC and/or an SCS and/or an SSB occasion corresponding to the first non CD-SSB are/is respectively the same as a frequency and/or an MTC and/or an SCS and or an SSB occasion corresponding to the second non CD-SSB, and the first PCI corresponding to the first non CD-SSB is the same as the second PCI corresponding to the second non CD-SSB.

Case C: PCI Conflict Between a CD-SSB and a Non CD-SSB

In this case, the first SSB is a first non CD-SSB, and the second SSB is a second CD-SSB. Based on whether the first non CD-SSB is directly adjacent to or indirectly adjacent to the second CD-SSB, there may be Case C-1 and Case C-2. Alternatively, the first SSB is a first CD-SSB, and the second SSB is a second non CD-SSB. Based on whether the first CD-SSB is directly adjacent to or indirectly adjacent to the second non CD-SSB, there may alternatively be Case C-1 and Case C-2.

Case C-1: PCI Collision Between the CD-SSB and the Non CD-SSB

The first CD-SSB is directly adjacent to the second non CD-SSB, a frequency and/or an MTC and/or an SCS and/or an SSB occasion corresponding to the first CD-SSB are/is respectively the same as a frequency and/or an MTC and/or an SCS and or an SSB occasion corresponding to the second non CD-SSB, and the first PCI corresponding to the first CD-SSB is the same as the second PCI corresponding to the second non CD-SSB.

Alternatively, the first non CD-SSB is directly adjacent to the second CD-SSB, a frequency and/or an MTC and/or an SCS and/or an SSB occasion corresponding to the first non CD-SSB are/is respectively the same as a frequency and/or an MTC and/or an SCS and or an SSB occasion corresponding to the second CD-SSB, and the first PCI corresponding to the first non CD-SSB is the same as the second PCI corresponding to the second CD-SSB.

Case C-2: PCI Confusion Between the CD-SSB and the Non CD-SSB

The first CD-SSB is indirectly adjacent to the second non CD-SSB, a frequency and/or an MTC and/or an SCS and/or an SSB occasion corresponding to the first CD-SSB are/is respectively the same as a frequency and/or an MTC and/or an SCS and or an SSB occasion corresponding to the second non CD-SSB, and the first PCI corresponding to the first CD-SSB is the same as the second PCI corresponding to the second non CD-SSB.

Alternatively, the first non CD-SSB is indirectly adjacent to the second CD-SSB, a frequency and/or an MTC and/or an SCS and/or an SSB occasion corresponding to the first non CD-SSB are/is respectively the same as a frequency and/or an MTC and/or an SCS and or an SSB occasion corresponding to the second CD-SSB, and the first PCI corresponding to the first non CD-SSB is the same as the second PCI corresponding to the second CD-SSB.

When the first SSB and the second SSB fall into any one of the foregoing three scenarios, it is determined that a conflict occurs between the first PCI corresponding to the first SSB and the second PCI corresponding to the second SSB, and it may be determined whether the conflict is a PCI collision or PCI confusion. When the PCI collision occurs, the terminal may detect one of the first SSB and the second SSB. When accessing the detected SSB, the terminal may be greatly interfered by the other SSB, or the terminal may be unable to access either of the first SSB and the second SSB that interfere with each other. This causes a call drop. When the PCI confusion occurs, if the terminal requests to be handed over to the first SSB, because the access network device does not know which SSB is the first SSB, the access network device may know only one SSB, and the terminal may be handed over to an incorrect SSB. Consequently, terminal handover fails.

FIG. 3 to FIG. 6 are schematic flowcharts of different communications methods according to this application, and all the methods may be used to resolve the problem described in the background. In the methods shown in FIG. 3 to FIG. 6, a first access network device may be the access network device 101 in FIG. 1, and a second access network device may be the access network device 102 in FIG. 1. Based on Scenario 1, the first access network device may be the gNB 101a in FIG. 1a, and the second access network device may be the gNB 102a in FIG. 1a. Alternatively, the first access network device may be the LTE eNB 101b in FIG. 1b, and the second access network device may be the LTE eNB 102b in FIG. 1b. Based on Scenario 2, the first access network device may be a primary node, and the second access network device is a secondary node. Based on Scenario 3, the first access network device may be a CU, and the second access network device may be a DU, where the CU and the DU may belong to a same base station, or may belong to different base stations.

Figure 3:
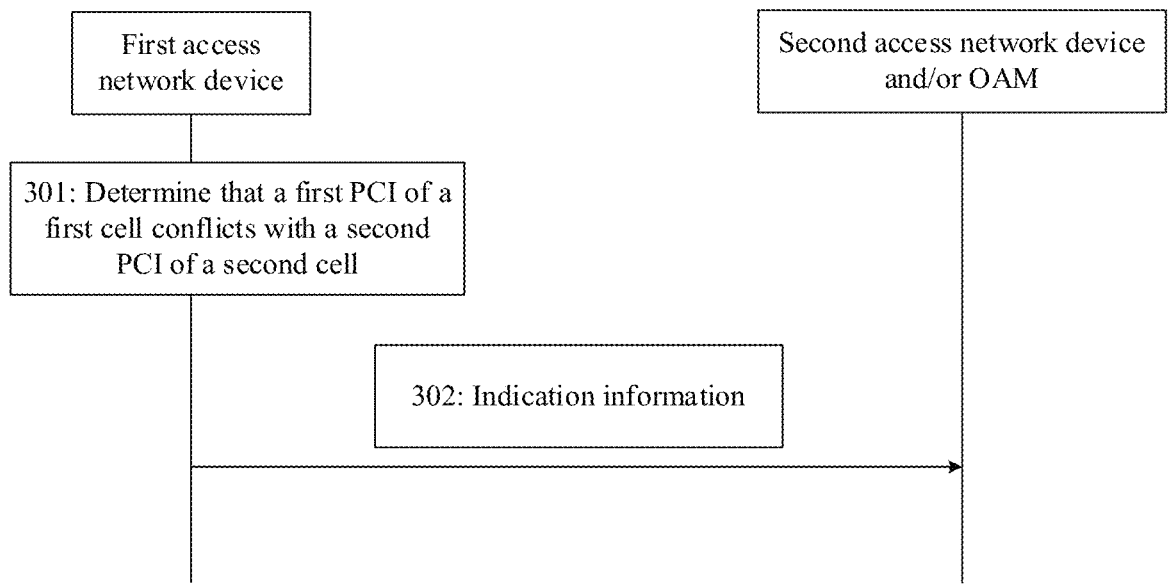
FIG. 3 is a schematic flowchart of a communications method according to this application.

FIG. 3 is a schematic flowchart of a communications method according to this application. The method includes the following steps.

Step 301: The first access network device determines that a first PCI of a first cell conflicts with a second PCI of a second cell.

The first PCI belongs to the first cell, the second PCI belongs to the second cell, the first PCI corresponds to a first SSB, and the second PCI corresponds to a second SSB. The first access network device may determine, based on the foregoing definitions of a conflict between PCIs, that the first PCI conflicts with the second PCI. Details are not described herein again.

In a possible implementation, a relationship between the first cell and the access network device and a relationship between the second cell and the access network device may be classified into the following four possible cases.

Case 1: The first cell belongs to the first access network device, and the second cell belongs to the second access network device. For example, the first access network device is a primary node, the first cell is a cell managed by the primary node, the second access network device is a secondary node, and the second cell is a cell managed by the secondary node. For another example, the first access network device and the second access network device are different nodes (for example, base stations such as the gNB 101a and the gNB 101b shown in FIG. 1a), and the first cell and the second cell are managed by different nodes, where different nodes may both be primary nodes, or may both be secondary nodes. For another example, the first access network device and the second access network device are different central units (CU), and the first cell and the second cell are managed by different CUs.

Case 2: Both the first cell and the second cell belong to the first access network device. For example, the first access network device is a node 1, the second access network device is a node 2, and the first cell and the second cell are cells of the node 1, where the node 1 and the node 2 may both be base stations. For another example, the first access network device is a primary node, the second access network device is a secondary node, and the first cell and the second cell are different cells managed by the primary node.

Case 3: Both the first cell and the second cell belong to the second access network device. For example, the first access network device is a node 1, the second access network device is a node 2, and the first cell and the second cell are cells of the node 2, where the node 1 and the node 2 may both be base stations. For another example, the first access network device is a CU, the second access network device is a distributed unit (DU), and the first cell and the second cell are different cells managed by the DU. For another example, the first access network device is a primary node, the second access network device is a secondary node, and the first cell and the second cell are different cells managed by the secondary node.

Case 4: The first cell belongs to the second access network device, and the second cell belongs to a third access network device, where the first access network device manages the second access network device and the third access network device. For example, the first access network device is a CU, the second access network device and the third access network device are different DUs managed by the CU, and the first cell and the second cell are managed by different DUs.

In this application, the first access network device may obtain the first PCI and the second PCI.

Based on Case 1, the first access network device may locally obtain the first PCI, and the first access network device may obtain the second PCI from the second access network device.

Based on Case 2, the first access network device may locally obtain the first PCI and the second PCI.

Based on Case 3, the first access network device may obtain the first PCI and the second PCI from the second access network device.

Based on Case 4, the first access network device may obtain the first PCI from the second access network device, and obtain the second PCI from the third access network device.

In a possible implementation, the second PCI corresponding to the second SSB may be carried in SSB information corresponding to the second cell (second SSB information for short) that is obtained by the first access network device.

Optionally, the SSB information corresponding to the second cell may further include one or more selected from the following: a frequency corresponding to the second SSB, a type of the second SSB, an MTC corresponding to the second SSB, an SCS corresponding to the second SSB, and an SSB occasion corresponding to the second SSB.

In a possible implementation, the SSB information corresponding to the second cell includes the second PCI corresponding to the second SSB.

In another possible implementation, the SSB information corresponding to the second cell includes the second PCI corresponding to the second SSB and one or more selected from the following: a frequency corresponding to the second SSB, a type of the second SSB, an MTC corresponding to the second SSB, an SCS corresponding to the second SSB, and an SSB occasion corresponding to the second SSB. This is not limited in this application. For example, the SSB information corresponding to the second cell includes the second PCI corresponding to the second SSB and the frequency corresponding to the second SSB. For another example, the SSB information corresponding to the second cell includes the second PCI corresponding to the second SSB, the frequency corresponding to the second SSB, and the type of the second SSB, where the type of the second SSB is a CD-SSB or a non CD-SSB. For another example, the SSB information corresponding to the second cell includes the second PCI corresponding to the second SSB, the frequency corresponding to the second SSB, the type of the second SSB, and the MTC corresponding to the second SSB. For another example, the SSB information corresponding to the second cell includes the second PCI corresponding to the second SSB, the frequency corresponding to the second SSB, the type of the second SSB, and the SCS corresponding to the second SSB. For another example, the SSB information corresponding to the second cell includes the second PCI corresponding to the second SSB, the frequency corresponding to the second SSB, the type of the second SSB, the SCS corresponding to the second SSB, and the SSB occasion corresponding to the second SSB. There may alternatively be other possible combinations, and the other possible combinations are not listed one by one herein.

Step 302: The first access network device sends indication information to the second access network device and/or OAM, where the indication information is used to indicate that the first PCI conflicts with the second PCI.

Correspondingly, the second access network device and/or the OAM receive/receives the indication information.

In a possible implementation, the indication information includes one or more selected from: the second PCI, the frequency corresponding to the second SSB, the type of the second SSB, the MTC corresponding to the second SSB, the SCS corresponding to the second SSB, the SSB occasion corresponding to the second SSB, and an NCGI corresponding to the second SSB.

For example, the indication information includes the second PCI. Alternatively, the indication information may include the second PCI and the type of the second SSB. Alternatively, the indication information may include the type of the second SSB and the frequency corresponding to the second SSB. Alternatively, the indication information may include the second PCI and the frequency corresponding to the second SSB. Alternatively, the indication information may include the second PCI, the type of the second SSB, and the frequency corresponding to the second SSB. Alternatively, the indication information may include the second PCI, the type of the second SSB, and the MTC corresponding to the second SSB. Alternatively, the indication information may include the second PCI, the type of the second SSB, and the SCS corresponding to the second SSB. Alternatively, the indication information may include the second PCI, the type of the second SSB, and the SSB occasion corresponding to the second SSB. There may alternatively be other possible combinations, and the other possible combinations are not listed one by one herein.

Optionally, in all possible implementations of the indication information, the indication information may further include the NCGI.

The indication information herein may be an index, and the index may indicate that the first PCI conflicts with the second PCI. Alternatively, the indication information may be an indication character, and the indication character may indicate that the first PCI conflicts with the second PCI. A specific form of the indication information may alternatively be another form. This is not limited in this application.

With reference to FIG. 1*a* in Scenario 1, if the gNB 101*a* is the first access network device, and the gNB 102*a* is the second access network device, the gNB 101*a* may send the indication information to the gNB 102*a* through an Xn-C interface. Correspondingly, the gNB 102*a* receives the indication information from the gNB 101*a* through the Xn-C interface.

With reference to FIG. 1*b* in Scenario 1, if the LTE eNB 101*b* is the first access network device, and the LTE eNB 102*b* is the second access network device, the LTE eNB 101*b* may send the indication information to the LTE eNB 102*b* through an X2-C interface. Correspondingly, the LTE eNB 102*b* receives the indication information from the LTE eNB 101*b* through the X2-C interface.

With reference to Network architecture 1 in Scenario 2, the LTE eNB 101*c* is the first access network device, the NR gNB 102*c* is the second access network device, and the LTE eNB 101*c* may send the indication information to the NR gNB 102*c* through the X2-C interface. Correspondingly, the NR gNB 102*c* receives the indication information from the LTE eNB 101*c* through the X2-C interface. For sending and receiving of the indication information in Case 1 with reference to Scenario 2, refer to the description of Network architecture 1 in Scenario 2. Details are not described herein again. With reference to Case 2.1 in Network architecture 2 in Scenario 2, the NR gNB 101*d* is the first access network device, the NG eNB 102*d* is the second access network device, and the NR gNB 101*d* may send the indication information to the NG eNB 102*d* through the Xn-C interface. Correspondingly, the NG eNB 102*d* receives the indication information from the NR gNB 101*d* through the Xn-C interface. With reference to Case 2.2 in Network architecture 2 in Scenario 2, the NG eNB 101*f* is the first access network device, the NR gNB 102*f* is the second access network device, and the NG eNB 101*f* may send the indication information to the NR gNB 102*f* through the Xn-C interface. Correspondingly, the NR gNB 102*f* receives the indication information from the NG eNB 101*f* through the Xn-C interface.

With reference to Scenario 3, in the CU-DU scenario, the following three possible implementations may be included, and all the following three possible implementations are optional steps. It may be understood that, with reference to Scenario 3, that the first access network device sends indication information to the second access network device and/or OAM is an optional step.

With reference to Scenario 3, in a possible implementation, the CU is the first access network device, and the DU is the second access network device. For Case 1 in Scenario 3, the CU 101*e* in the gNB-1 may send the indication information to the DU 102*e* in the gNB-1 through an F1 interface. Correspondingly, the DU 102*e* in the gNB-1 receives the indication information from the CU 101*e* in the gNB-1 through the F1 interface. For Case 2 in Scenario 3, the CU 101*e* in the gNB-1 may first send the indication information to the CU 101*e* in the gNB-2 through the Xn-C interface, and then the CU 101*e* in the gNB-2 sends the indication information to the DU 102*e* in the gNB-2 through the F1 interface. Correspondingly, the DU 102*e* in the gNB-2 receives the indication information from the CU 101*e* in the gNB-1.

With reference to Scenario 3, in another possible implementation, the CU is the second access network device, and the DU is the first access network device. In this implementation, the DU may send the indication information to the OAM or the CU. Correspondingly, the OAM or the CU receives the indication information from the DU.

With reference to Scenario 3, in still another possible implementation, both the first access network device and the second access network device are CUs. For Case 3 in Scenario 3, the CU 101*e* in the gNB-1 may send the indication information to the CU 101*e* in the gNB-2 through the Xn-C interface. This implementation is the same as a process of the NG eNB 102*d* and the NR gNB 101*d* in Scenario 2.

In the foregoing three scenarios, the indication information may be included in an existing message or a newly-defined message, and sent through the X2-C, the Xn-C, or the F1 interface. This is not limited in this application.

It can be seen from step 301 and step 302, the first access network device may determine, based on the first PCI corresponding to the first cell and the second PCI corresponding to the second cell, that the first PCI conflicts with the second PCI, where the first PCI corresponds to the first SSB, and the second PCI corresponds to the second SSB. In this way, a PCI conflict corresponding to the SSB in the NR system can be detected. This helps eliminate or reduce the PCI conflict in an NR network, improve a success rate of terminal handover, and further reduce a call drop rate of a terminal. In addition, because the first cell and the second cell may be managed by different access network devices or by a same access network device, the communications method provided in this application is applicable to a plurality of networking scenarios, and is highly flexible.

Before step 301, in a possible implementation, the first cell belongs to the first access network device and the second cell belongs to the second access network device. The first access network device may obtain, through an interface between the first access network device and the second access network device, the SSB information corresponding to the second cell. Alternatively, the first access network device may obtain, through an air interface between the first access network device and a terminal device, the SSB information corresponding to the second cell. The SSB information corresponding to the second cell may include one or more selected from: the PCI corresponding to the second SSB, the frequency corresponding to the second SSB, the MTC corresponding to the second SSB, the SCS corresponding to the second SSB, the type of the second SSB (for example, a CD-SSB or a non CD-SSB), and the SSB occasion corresponding to the second SSB.

For example, the second access network device may send, to the first access network device, the SSB information corresponding to the second cell. The second access network device may directly send, to the first access network device, the SSB information corresponding to the second cell. Alternatively, the second access network device may send, to a relay device, the SSB information corresponding to the second cell, and the relay device transparently transmits, to the first access network device, the SSB information corresponding to the second cell.

Correspondingly, the first access network device may receive the SSB information corresponding to the second cell that is sent by the second access network device. In a possible implementation, the first access network device may determine, based on the received SSB information corresponding to the second cell and SSB information corresponding to the first cell, whether the first PCI conflicts with the second PCI. It may be understood that step 301 is performed after the SSB information corresponding to the second cell is obtained.

With reference to Scenario 1, the second access network device may send, to the first access network device through the Xn-C interface, the SSB information corresponding to the second cell. Correspondingly, the first access network device may receive the SSB information corresponding to the second cell through the Xn-C interface.

With reference to Network architecture 1 in Scenario 2, the second access network device may send to the first access network device through the X2-C interface the SSB information corresponding to the second cell. Correspondingly, the first access network device may receive the SSB information corresponding to the second cell through the X2-C interface. With reference to the two cases in Network architecture 1 in Scenario 2, the second access network device may send to the first access network device through the Xn-C interface the SSB information corresponding to the second cell. Correspondingly, the first access network device may receive the SSB information corresponding to the second cell through the Xn-C interface.

With reference to Scenario 3, the CU is the first access network device, and the DU is the second access network device. For example, with reference to Case 1 in Scenario 3, the DU 102*e* in the gNB-1 may send the SSB information to the CU 101*e* in the gNB-1 through the F1 interface. Correspondingly, the CU 101*e* in the gNB-1 may receive the SSB information from the DU 102*e* in the gNB-1 through the F1 interface. With reference to Case 2 in Scenario 3, the DU 102*e* in the gNB-2 may first send, to the CU 101*e* in the gNB-2 through the F1 interface, the SSB information from the DU 102*e* in the gNB-2, and then the CU 101*e* in the gNB-2 sends, to the CU 101*e* in the gNB-1 through the Xn-C interface, the received SSB information from the DU 102*e* in the gNB-2. Correspondingly, the CU 101*e* in the gNB-1 receives the SSB information from the DU 102*e* in the gNB-2.

For example, the first access network device is a CU 1, the second access network device is a DU 1, and the DU 1 is managed by the CU 1. If the first cell is a cell 1 of the DU 1, it is assumed that the CU 1 determines that a direct neighbor cell of the cell 1 is a cell 2, indirect neighbor cells of the cell 1 are a cell 3 and a cell 4, and the indirect neighbor cells, the cell 3 and the cell 4, are direct neighbor cells of the cell 2. In this case, the CU 1 sends, to the DU 1, a PCI of the cell 2 and SSB information corresponding to the cell 2, a PCI of the cell 3 and SSB information corresponding to the cell 3, and a PCI of the cell 4 and SSB information corresponding to the cell 4. The DU 1 determines whether the PCI of the cell 1 conflicts with the PCI of the cell 2, the PCI of the cell 3, and the PCI of the cell 4.

Optionally, the DU 1 may learn in advance that the direct neighbor cell of the cell 1 is the cell 2, and the DU 1 sends an identifier of the cell 2 to the CU 1, to request to obtain a neighbor cell of the cell 2, namely, an indirect neighbor cell of the cell 1. The CU 1 returns, to the DU 1, the PCI of the cell 2 and the SSB information corresponding to the cell 2, the PCI of the cell 3 and the SSB information corresponding to the cell 3, and the PCI of the cell 4 and the SSB information corresponding to the cell 4.

It should be noted that a neighbor cell (a direct neighbor cell or an indirect neighbor cell) of the first cell may be determined by the first access network device. In a possible implementation, the second access network device may request, from the first access network device, a PCI of the neighbor cell of the first cell and SSB information corresponding to the neighbor cell. In another possible implementation, the first access network device may actively send, to the second access network device, a PCI of the neighbor cell of the first cell and SSB information corresponding to the neighbor cell.

With reference to Scenario 3, when the CU is the second access network device and the DU is the first access network device, the CU 101*e* in the gNB-1 may send, to the DU 102*e* in the gNB-1 through the F1 interface, the SSB information from the CU 101*e* in the gNB-1, with reference to Case 1 in Scenario 3. Correspondingly, the DU 102*e* in the gNB-1 may receive the SSB information from the CU 101*e* in the gNB-1 through the F1 interface. With reference to Case 2 in Scenario 3, the CU 101*e* in the gNB-1 sends, to the CU 101*e* in the gNB-2 through the Xn-C interface, the SSB information from the CU 101*e* in the gNB-1, and then the CU 101*e* in the gNB-2 sends, to the DU 102e in the gNB-2 through the F1 interface, the received SSB information from the CU 101e in the gNB-1.

With reference to Scenario 3, in another possible implementation, both the first access network device and the second access network device are CUs. For Case 3 in Scenario 3, the CU 101e in the gNB-2 may send, to the CU 101e in the gNB-1 through the Xn-C interface, the SSB information from the CU 101e in the gNB-2. This implementation is the same as a process of the NG eNB 102d and the NR gNB 101d in Scenario 2.

Before step 301, in another possible implementation, both the first cell and the second cell belong to the first access network device. The first access network device may locally obtain the configured SSB information corresponding to the first cell and the SSB information corresponding to the second cell.

Before step 301, in another possible implementation, both the first cell and the second cell belong to the second access network device. The first access network device may obtain, from the second access network device, the SSB information corresponding to the first cell and the SSB information corresponding to the second cell. The first access network device may obtain, through the interface between the first access network device and the second access network device, the SSB information corresponding to the first cell and the SSB information corresponding to the second cell. Alternatively, the first access network device may obtain, through the air interface between the first access network device and the terminal device, the SSB information corresponding to the first cell and the SSB information corresponding to the second cell. For descriptions with reference to the foregoing three scenarios, refer to the foregoing content. Details are not described herein again.

Before step 301, in still another possible implementation, the first cell belongs to the second access network device and the second cell belongs to the third access network device, where the first access network device manages the second access network device and the third access network device. With reference to Case 2 in Scenario 3, the DU 102e in the gNB-2 may be the second access network device, the DU 102e in the gNB-1 may be the third access network device, and the first access network device may be the CU 101e in the gNB-1. The DU 102e in the gNB-2 may first send, to the CU 101e in the gNB-2 through the F1 interface, the SSB information from the DU 102e in the gNB-2, and then the CU 101e in the gNB-2 sends, to the CU 101e in the gNB-1 through the Xn-C interface, the received SSB information from the DU 102e in the gNB-2. The DU 102e in the gNB-1 may first send, to the CU 101e in the gNB-1 through the F1 interface, the SSB information from the DU 102e in the gNB-1. Correspondingly, the CU 101e in the gNB-1 receives the SSB information from the DU 102e in the gNB-2.

As it is determined that the first PCI conflicts with the second PCI, this application provides the following three implementations to resolve a problem that the first PCI conflicts with the second PCI. The three implementations may be implemented separately, or may be implemented in combination. This is not limited in this application.

Implementation 1: A second access network device modifies a second PCI based on indication information.

Figure 4:
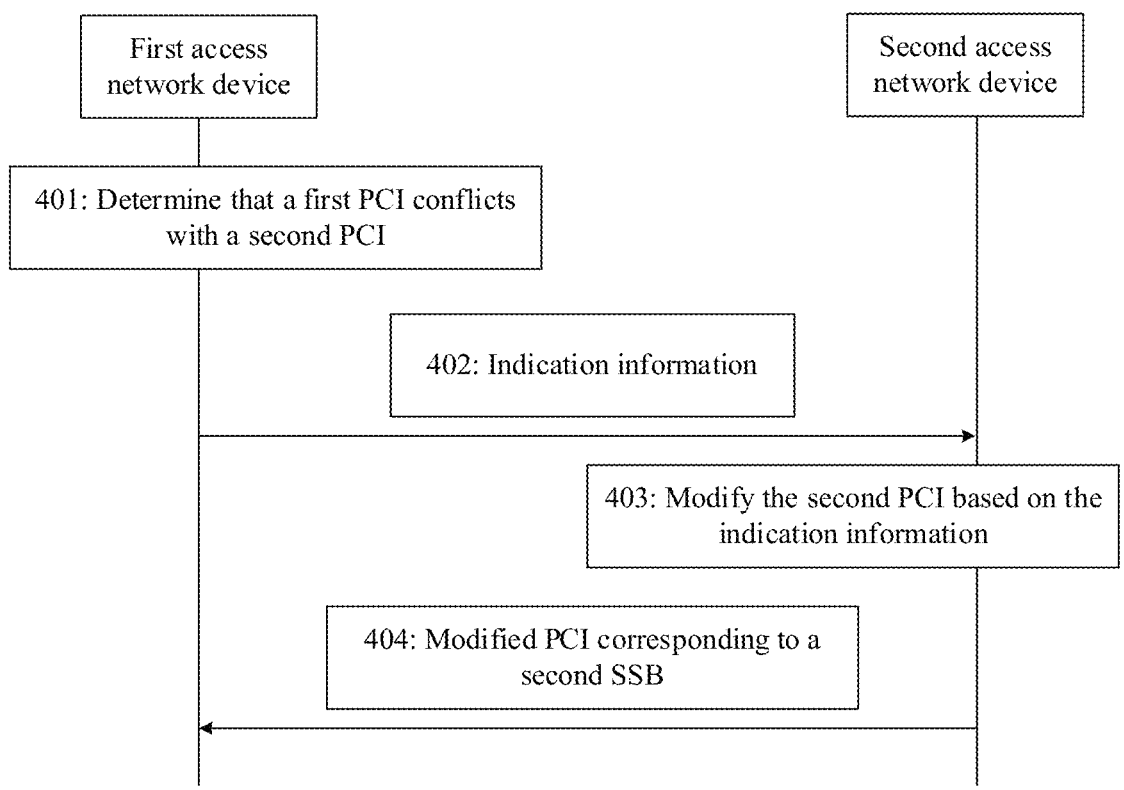
FIG. 4 is a schematic flowchart of another communications method according to this application.

Based on Implementation 1, FIG. 4 is a schematic flowchart of another communications method according to this application. The method includes the following steps.

Step 401: A first access network device determines that a first PCI conflicts with a second PCI.

Step 401 is the same as step 301 in the embodiment in FIG. 3. For details, refer to the foregoing description.

Step 402: The first access network device sends indication information to a second access network device.

The indication information in step 402 is the same as the indication information in step 302 in the embodiment in FIG. 3. For details, refer to the foregoing description. Further, for an interface through which the first access network device sends the indication information to the second access network device, refer to the description with reference to specific scenarios in step 302. Details are not described herein again.

Step 403: The second access network device modifies the second PCI based on the indication information.

In a possible implementation, the second access network device determines a second SSB based on the indication information, and modifies the second PCI corresponding to the second SSB. For example, when a CD-SSB and a non CD-SSB correspond to a same PCI, the second access network device may determine, based on the second PCI and a type of the second SSB that are included in the indication information, whether the PCI corresponding to the CD-SSB or the PCI corresponding to the non CD-SSB needs to be modified. For another example, because SSBs corresponds to different frequencies, the second access network device may determine, based on the second PCI and a frequency corresponding to the second SSB that are included in the indication information, that the PCI corresponding to the second SSB needs to be modified. For another example, the second access network device may determine, based on the frequency corresponding to the second SSB, the type of the second SSB, and the second PCI that are included in the indication information, that the PCI corresponding to the second SSB needs to be modified.

PCI modification needs to meet the following two requirements. The first requirement is collision-free (collision-free), that is, any two adjacent intra-frequency SSBs cannot use a same PCI. The second requirement is confusion-free (confusion-free), that is, any two intra-frequency SSBs in all SSBs adjacent to a same SSB cannot use a same PCI. For SSBs of a same access network device, the SSBs may serve as special SSBs that are directly adjacent to each other. To be specific, PCIs corresponding to any two or more SSBs of the same access network device also need to meet the foregoing confusion-free and conflict-free requirements.

For example, the second access network device maintains an available PCI set, and the second access network device may use any PCI in the PCI set. The second access network device may modify, based on the indication information and the two requirements that the PCI modification needs to meet, the second PCI into an available PCI in the PCI set, that is, select an available PCI to replace the second PCI. In this way, the second access network device does not need to request an available PCI from an OAM. This helps improve efficiency when modifying a PCI that conflicts with another PCI.

Step 404: The second access network device sends a modified second PCI to the first access network device.

Step 404 is an optional step. In this step, the first access network device can update, in time, the PCI corresponding to the second SSB, to select an appropriate SSB for a terminal during terminal handover.

Herein, the second access network device may send, through the interface for receiving the indication information, the modified PCI corresponding to the second SSB. The modified PCI corresponding to the second SSB may alternatively be a newly-defined message. This is not limited in this application.

The communications method shown in FIG. 4 may be a possible example of the communications method shown in FIG. 3.

Implementation 2: The OAM modifies a first PCI or a second PCI based on indication information.

Figure 5:
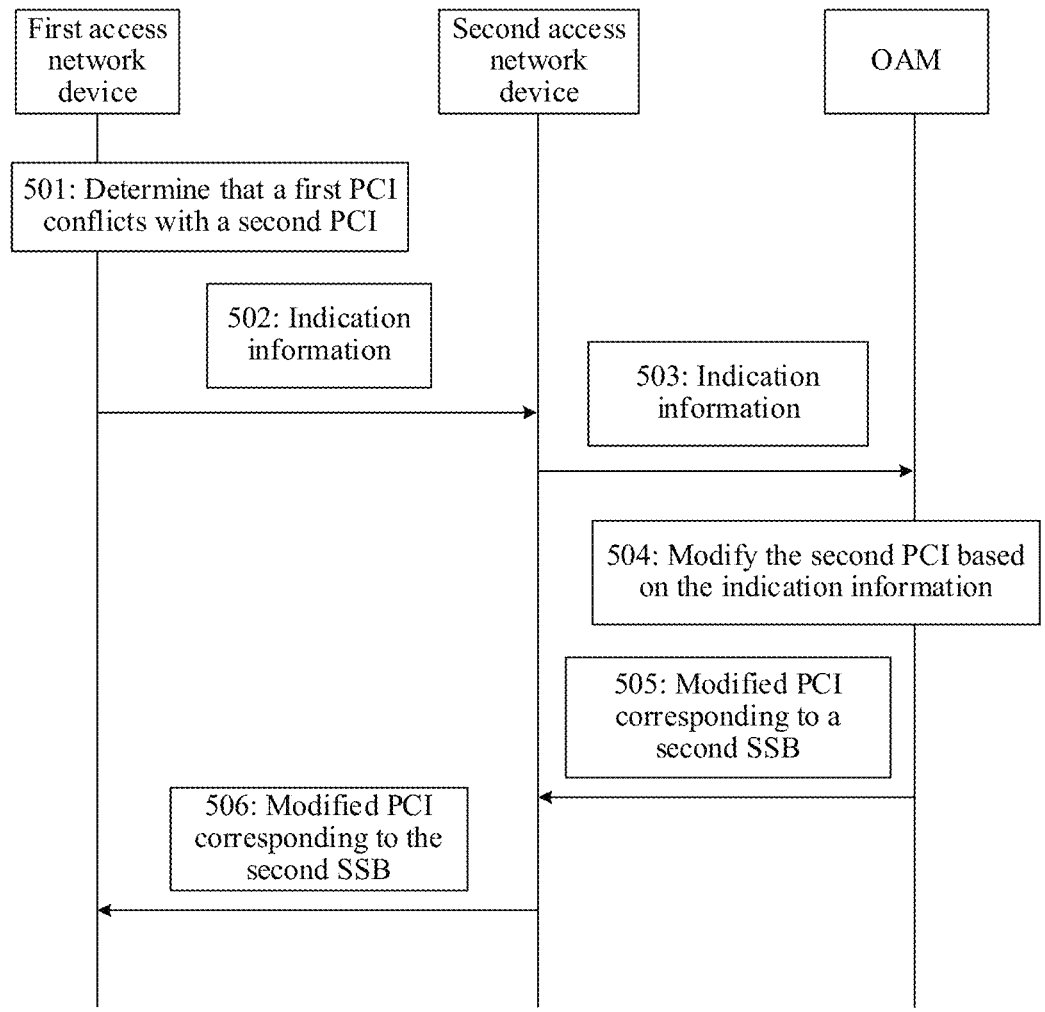
FIG. 5 is a schematic flowchart of another communications method according to this application.

Based on Implementation 2, FIG. 5 is a schematic flowchart of another communications method according to this application. The method includes the following steps.

Step 501: A first access network device determines that a first PCI conflicts with a second PCI.

Step 501 is the same as step 301 in the embodiment in FIG. 3. For details, refer to the foregoing description.

Step 502: The first access network device sends indication information to a second access network device.

The indication information in step 502 is the same as the indication information in step 302 in the embodiment in FIG. 3. For details, refer to the foregoing description. Further, for an interface through which the first access network device sends the indication information to the second access network device, refer to the description with reference to specific scenarios in step 302. Details are not described herein again.

Step 503: The second access network device sends the indication information to an OAM.

In a possible implementation, the second access network device sends the indication information to the OAM. In addition to the content in step 302, the indication information may further carry an identifier of a cell to which a second SSB belongs and/or an identifier of the second access network device.

Step 504: The OAM modifies the second PCI based on the indication information.

Herein, after receiving the indication information, the OAM reallocates a new PCI to the second SSB, and the new PCI allocated by the OAM to the second SSB also needs to meet the two requirements that PCI modification needs to meet in step 403.

Step 505: The OAM sends a modified PCI to the second access network device.

Step 506: The second access network device sends the modified PCI to the first access network device.

This step is an optional step. For details, refer to step 404. Details are not described herein again.

Figure 6:
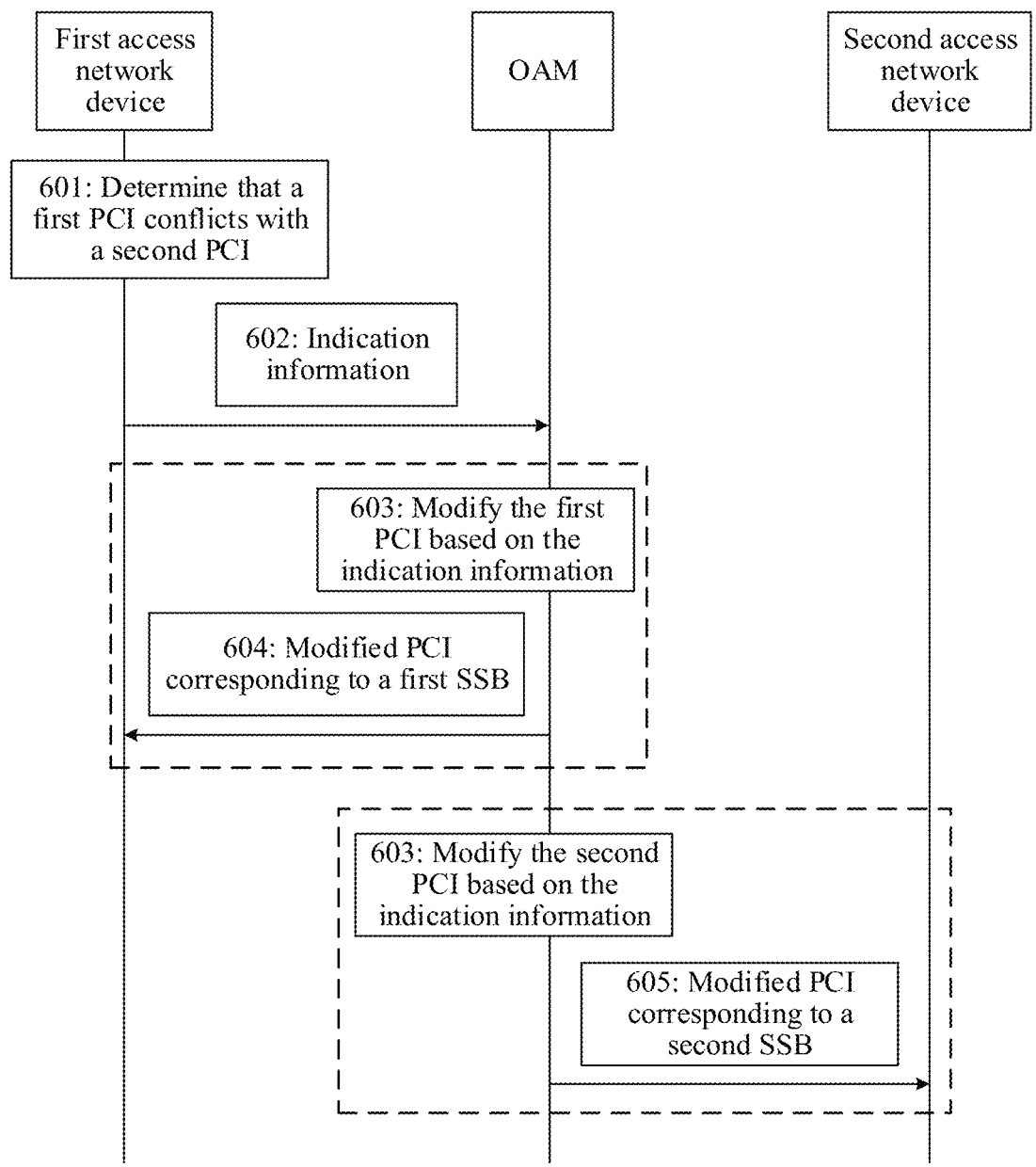
FIG. 6 is a schematic flowchart of still another communications method according to this application.

Based on Implementation 2, FIG. 6 is a schematic flowchart of still another communications method according to this application. The method includes the following steps.

Step 601: A first access network device determines that a first PCI conflicts with a second PCI.

Step 601 is the same as step 301 in the embodiment in FIG. 3. For details, refer to the foregoing description.

Step 602: The first access network device sends indication information to an OAM.

In a first possible implementation, in addition to the content of the indication information in step 302 in the embodiment in FIG. 3, the indication information may further carry an identifier of a cell to which a second SSB belongs and/or an identifier of the second access network device to which the cell belongs.

In a second possible implementation, the indication information may further include SSB information corresponding to a first cell. Optionally, the SSB information corresponding to the first cell may include the first PCI and a type of a first SSB; the first PCI and a frequency corresponding to a first SSB; the first PCI, a type of a first SSB, and a frequency corresponding to the first SSB; or the first PCI, a type of a first SSB, and an MTC corresponding to the first SSB. Alternatively, the indication information may include the first PCI, a type of a first SSB, and an SCS corresponding to the first SSB. Alternatively, the SSB information corresponding to the first cell may include the first PCI, a type of a first SSB, and an SSB occasion corresponding to the first SSB. Optionally, the indication information may further carry an identifier of a cell to which the first SSB belongs and/or an identifier of the first access network device and/or an NCGI corresponding to the first SSB.

In a third possible implementation, the indication information may include SSB information corresponding to a first cell and SSB information corresponding to a second cell. Optionally, the indication information may further include the first PCI, a frequency corresponding to a first SSB, the second PCI, and a frequency corresponding to a second SSB. Alternatively, the indication information may include the first PCI, a frequency corresponding to a first SSB, the second PCI, and a type of a second SSB. Alternatively, the indication information may include the first PCI, a frequency corresponding to a first SSB, the second PCI, a type of a second SSB, and a frequency corresponding to the second SSB. Alternatively, the indication information may include the first PCI, a type of a first SSB, the second PCI, and a type of a second SSB. Alternatively, the indication information may include the first PCI, a type of a first SSB, the second PCI, and a frequency corresponding to a second SSB. Alternatively, the indication information may include the first PCI, a type of a first SSB, the second PCI, a type of a second SSB, and a frequency corresponding to the second SSB. Alternatively, the indication information may include the first PCI, a type of a first SSB, a frequency corresponding to the first SSB, the second PCI, and a frequency corresponding to a second SSB. Alternatively, the indication information may include the first PCI, a type of a first SSB, a frequency corresponding to the first SSB, the second PCI, and a type of a second SSB. Alternatively, the indication information may include the first PCI, a type of a first SSB, a frequency corresponding to the first SSB, the second PCI, a type of a second SSB, and a frequency corresponding to the second SSB. Alternatively, the indication information may include one or more selected from: the first PCI, a type of a first SSB, an MTC corresponding to the first SSB, an SCS corresponding to the first SSB, an SSB occasion corresponding to the first SSB, and an NCGI corresponding to the first SSB, and one or more selected from: the second PCI, a type of a second SSB, an MTC corresponding to the second SSB, an SCS corresponding to the second SSB, an SSB occasion corresponding to the second SSB, and an NCGI corresponding to the second SSB. There may alternatively be another possible combination. This is not limited in this application. Optionally, the indication information may further include an identifier of a cell to which the second SSB belongs and/or an identifier of the second access network device and an identifier of a cell to which the first SSB belongs and/or an identifier of the first access network device.

Step 603: The OAM modifies the first PCI or the second PCI based on the indication information.

For example, if the indication information is the indication information in the first possible implementation in step 602, the OAM modifies the second PCI, and then performs step 604. If the indication information is the indication information in the second possible implementation in step 602, the OAM modifies the first PCI, and then performs step 605. If the indication information is the indication information in the third possible implementation in step 602, the OAM may modify the first PCI or may modify the second PCI. This is not specifically limited herein. If the first PCI is modified, step 604 is performed subsequently. If the second PCI is modified, step 605 is performed subsequently.

For a process of modifying the PCI by the OAM, refer to the description in step 503. Details are not described herein again.

Step 604: The OAM sends a modified first PCI and/or a modified second PCI to the first access network device.

Optionally, the first access network device sends the modified second PCI to the second access network device.

Optionally, the OAM directly sends the modified second PCI to the second access network device.

Implementation 3: A first access network device modifies a first PCI and/or a second PCI.

Figure 7:
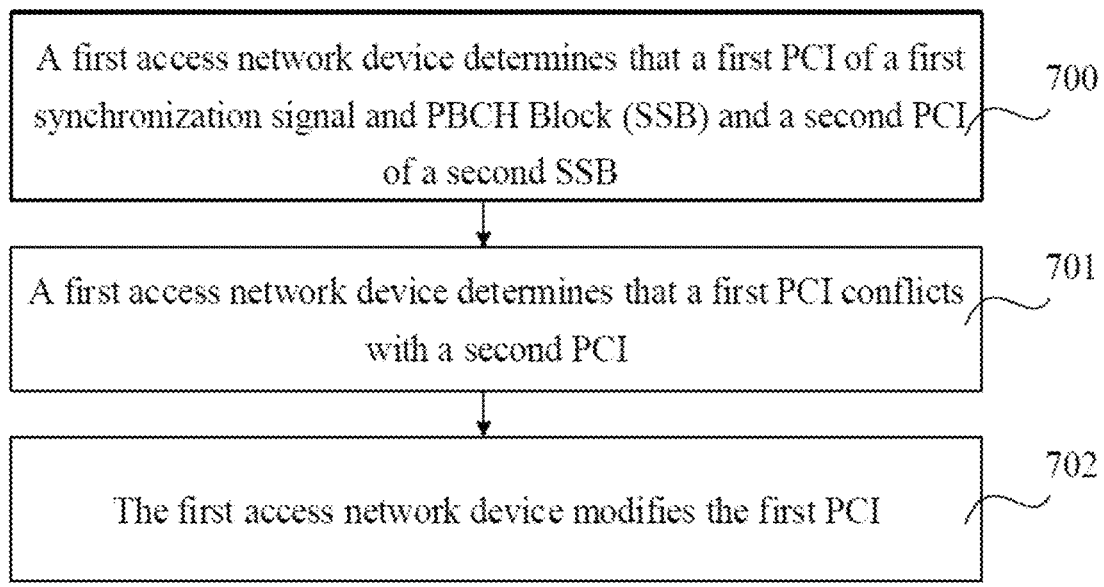
FIG. 7 is a schematic flowchart of still another communications method according to this application.

FIG. 7 is a schematic flowchart of still another communications method according to this application. The method includes the following steps.

Step 700: A first access network device determines a first PCI of a first SSB and a second PCI of a second SSB. Step 701: The first access network device determines that the first PCI conflicts with the second PCI.

Step 701 is the same as step 301 in the embodiment in FIG. 3. For details, refer to the foregoing description.

Step 702: The first access network device modifies the first PCI.

In a possible implementation, the first access network device may obtain range information of the first PCI and/or range information of the second PCI, and may modify the first PCI and/or the second PCI based on the range information of the first PCI and/or the range information of the second PCI, where the range information of the first PCI is a range of an available PCI of a first cell, and the range information of the second PCI is a range of an available PCI of a second cell. This improves efficiency when modifying, by the first access network device, a PCI.

Herein, the first access network device may modify the first PCI, or may modify the second PCI, or may modify the first PCI and the second PCI. That the first access network device modifies the first PCI means that the first access network device modifies the first PCI corresponding to a first SSB into a PCI that does not conflict with the second PCI. Specifically, the first access network device may modify the first PCI based on the range information of the first PCI.

For example, if the range information of the first PCI is [PCI=1, PCI=90], the first access network device needs to select a PCI in the range of [PCI=1, PCI=90] when modifying the first PCI. That the first access network device modifies the second PCI means that the first access network device modifies the second PCI into a PCI that does not conflict with the first PCI. The first access network device may modify the second PCI based on the range information of the second PCI. For example, if the range information of the second PCI is [PCI=100, PCI=110], the first access network device needs to select a PCI in the range of [PCI=100, PCI=110] when modifying the second PCI.

In a possible implementation, the first access network device may send indication information to a second access network device, or may send indication information to an OAM server, or may send indication information to both a second access network device and an OAM, or may send indication information to neither a second access network device nor an OAM. This is not specifically limited in this application.

In a possible implementation, the first access network device may send a modified first PCI to the second access network device. Alternatively, the first access network device may send a modified second PCI to the second access network device. The modified first PCI or the modified second PCI may be sent by carrying in the indication information that is sent by the first access network device to the second access network device, or may be sent by carrying in a newly-defined message. This is not limited in this application.

It should be noted that the indication information may be used to indicate that the first PCI conflicts with the second PCI. For example, the first PCI and the second PCI that conflict with each other may be directly indicated. Alternatively, the indication information may be used to indicate a modified PCI of the first access network device, where the modified PCI may be a PCI obtained after the first PCI corresponding to the first SSB is modified, or may be a PCI obtained after the second PCI corresponding to the second SSB is modified.

Alternatively, the indication information may indicate that the first access network device has resolved a conflict between the first PCI and the second PCI. This is not specifically limited in this application.

For the foregoing three implementations, if the conflict between the first PCI and the second PCI is the PCI conflict between the CD-SSB and the non CD-SSB in Case C, the PCI corresponding to the non CD-SSB may be preferentially modified, so that the first PCI does not conflict with the second PCI. During cell selection, a terminal usually accesses an access network device based on a synchronization signal of the CD-SSB, and the non CD-SSB usually serves as a secondary component carrier and is usually used for measurement. Therefore, preferential modification of the non CD-SSB has minimum impact on access by the terminal.

Figure 8:
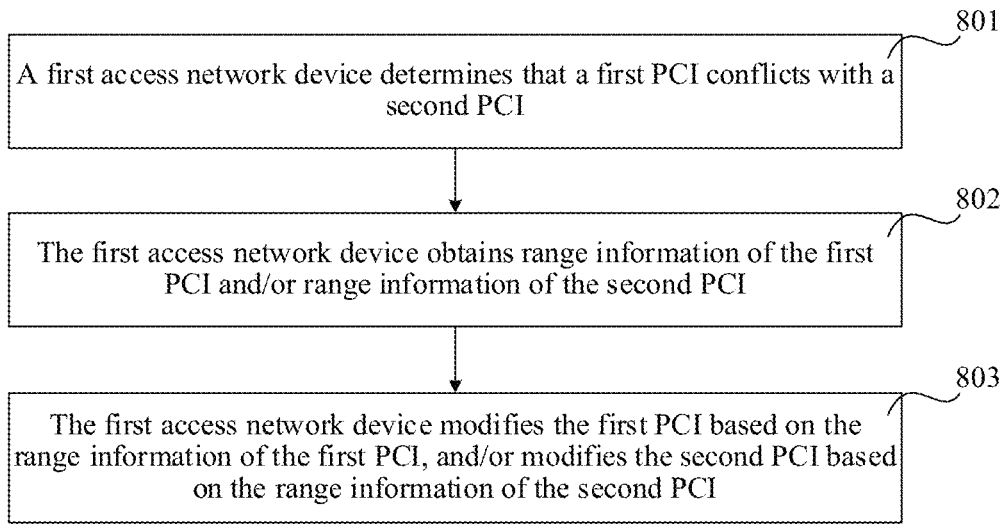
FIG. 8 is a schematic flowchart of another communications method according to this application.

FIG. 8 is a schematic flowchart of another communications method according to this application. The method includes the following steps.

Step 801: A first access network device determines that a first PCI conflicts with a second PCI.

Step 802: The first access network device obtains range information of the first PCI and/or range information of the second PCI.

The range information of the first PCI is a range of an available PCI of a first cell, and the range information of the second PCI is a range of an available PCI of a second cell.

In step 802, that the first access network device obtains range information of the first PCI and/or range information of the second PCI may include the following four cases.

Case 1: When the first cell belongs to the first access network device, and the second cell belongs to a second access network device, the first access network device may locally obtain the range information of the first PCI, and the first access network device may obtain the range information of the second PCI from the second access network device.

In a possible implementation, the range information of the first PCI may be determined by the first access network device, or may be sent to the first access network device after being determined by the OAM of the first access network device. The range information of the second PCI may be determined by the second access network device, or may be sent to the second access network device after being determined by the OAM of the second access network device.

Case 2: When both the first cell and the second cell belong to the first access network device, the first access network device may locally obtain the range information of the first PCI and the range information of the second PCI.

In a possible implementation, both the range information of the first PCI and the range information of the second PCI may be determined by the first access network device, or may be sent to the first access network device after being determined by the OAM of the first access network device.

Case 3: When both the first cell and the second cell belong to the second access network device, the first access network device may obtain, from the second access network device, the range information of the first PCI and the range information of the second PCI.

In a possible implementation, both the range information of the first PCI and the range information of the second PCI may be determined by the second access network device, or may be sent to the second access network device after being determined by the OAM of the second access network device.

Case 4: When the first cell belongs to the second access network device, and the second cell belongs to a third access network device, the first access network device may obtain the range information of the first PCI from the second access network device, and obtain the range information of the second PCI from the third access network device, where the first access network device manages the second access network device and the third access network device.

In a possible implementation, the range information of the first PCI may be determined by the second access network device, or may be sent to the second access network device after being determined by the OAM of the second access network device. The range information of the second PCI may be determined by the third access network device, or may be sent to the third access network device after being determined by OAM of the third access network device.

In a possible implementation, each cell of the first access network device may correspond to one piece of range information of a PCI, and the range information of the PCI corresponding to each cell may be the same or may be different. Each cell of the second access network device may correspond to one piece of the range information of a PCI, and the range information of the PCI corresponding to each cell may be the same or may be different.

In another possible implementation, the first access network device may correspond to one piece of range information of a PCI, and the range information of the PCI may be used for each cell of the first access network device. The second access network device may correspond to one piece of range information of a PCI, and each cell of the second access network device may use the range information of the PCI.

There is no sequence between step 801 and step 802. Step 801 may be performed before step 802, or step 802 may be performed before step 801. This is not limited in this application.

Step 803: The first access network device may modify the first PCI based on the range information of the first PCI, or may modify the second PCI based on the range information of the second PCI.

It can be seen from step 801 to step 803 that the first access network device modifies a PCI that conflicts with another PCI based on the range information of a PCI. This helps improve efficiency when the second access network device modifies a PCI.

In a possible implementation, the first access network device may be a CU, and the second access network device may be a DU.

Figure 9:
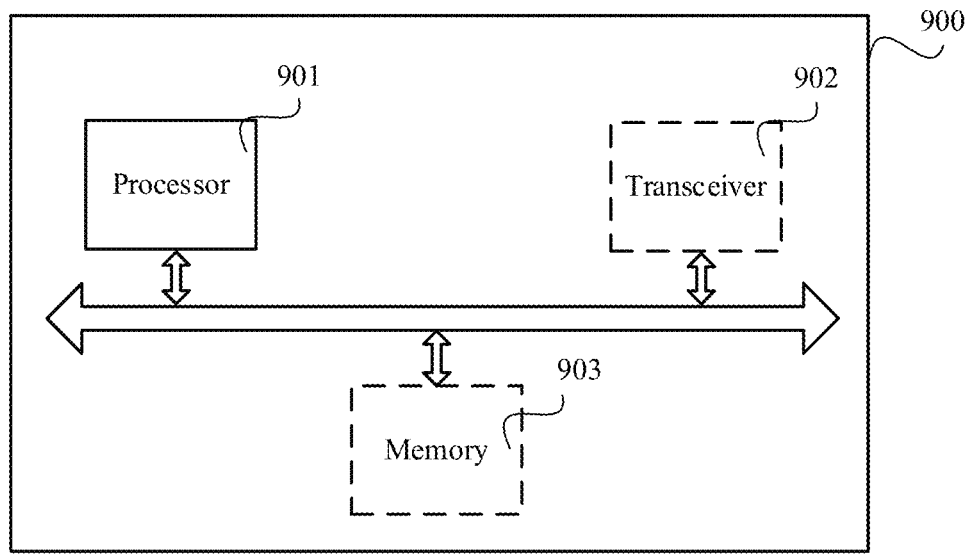
FIG. 9 is a schematic structural diagram of a communications apparatus according to this application.

Based on the foregoing content and a same concept, this application provides a communications apparatus 900, configured to perform any solution of the foregoing method performed by the first access network device, or configured to perform any solution of the foregoing method performed by the second access network device. FIG. 9 is a schematic structural diagram of a communications apparatus according to this application. The communications apparatus 900 includes a processor 901. Optionally, a transceiver 902 and a memory 903 may further be included, where the processor 901, the transceiver 902, and the memory 903 are connected to each other by using a bus. Alternatively, the communications apparatus 900 may be the access network device 101 or the access network device 102 in FIG. 1, or may be the gNB 101a or the gNB 102a in FIG. 1a, or may be the LTE eNB 101b or the LTE eNB 102b in FIG. 1b, or may be the LTE eNB 101c or the NR gNB 102c in FIG. 1c, or may be the NG eNB 102d or the NR gNB 101d in FIG. 1d, or may be the CU 101e or the DU 102e in FIG. 1e, or may be the NG eNB 101f or the NR gNB 102f in FIG. 1f.

The memory 903 may include a volatile memory, for example, a random-access memory (RAM). Alternatively, the memory 903 may include a non-volatile memory, for example, a flash memory, a hard disk (HDD), or a solid-state drive (SSD). Alternatively, the memory 903 may include a combination of the foregoing types of memories.

The transceiver 902 is used by the communications apparatus to communicate with another communications apparatus. For example, the communications apparatus may communicate with a terminal device or an access network device by using the transceiver 902. Optionally, the transceiver 902 may be a communications interface, and the communications interface may implement a function of the X2 interface, the Xn interface, or the F1 interface in the foregoing embodiments.

The processor 901 may be a central processing unit (CPU), a network processor (NP), or a combination of a CPU and an NP. The processor 901 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 903 may further be configured to store program instructions. The processor 901 invokes the program instructions stored in the memory 903, to perform one or more steps or an optional implementation in the embodiments shown in the foregoing solution, so that the communications apparatus 900 implements a function of the access network device in the foregoing method.

In an application, the apparatus may be the first access network device in any one of the foregoing embodiments, or may be a component (for example, a chip or a circuit) in the first access network device. The apparatus may perform the solutions correspondingly performed by the first access network device in FIG. 3, FIG. 4, FIG. 6, FIG. 7, and FIG. 8.

The processor 901 is configured to execute the instructions stored in the memory, and control the transceiver 902 to receive and send a signal. When executing the instructions stored in the memory, the processor 901 in the communications apparatus 800 is configured to determine that a first PCI of a first cell conflicts with a second PCI of a second cell, where the first PCI corresponds to a first SSB, and the second PCI corresponds to a second SSB. The transceiver 902 is configured to send indication information to a second access network device, where the indication information is used to indicate that the first PCI conflicts with the second PCI.

In a possible implementation, the transceiver 902 is further configured to obtain SSB information corresponding to the first cell and SSB information corresponding to the second cell, where the SSB information corresponding to the first cell includes the first PCI, and the SSB information corresponding to the second cell includes the second PCI.

In a possible implementation, the SSB information corresponding to the first cell further includes a frequency corresponding to the first SSB, and the SSB information corresponding to the second cell further includes a frequency corresponding to the second SSB. The processor 901 is configured to: when determining that the first SSB is adjacent to the second SSB, the frequency corresponding to the first SSB is the same as the frequency corresponding to the second SSB, and the first PCI is the same as the second PCI, determine that the first PCI conflicts with the second PCI.

In a possible implementation, the processor 901 is configured to determine that the first SSB is directly adjacent to the second SSB, or determine that the first SSB and the second SSB are directly adjacent to a third SSB.

In a possible implementation, the SSB information corresponding to the second cell further includes a type of the second SSB, where the type of the second SSB is a CD-SSB or a non CD-SSB.

In a possible implementation, the indication information includes: the second PCI and the type of the second SSB; the second PCI and the frequency corresponding to the second SSB; or the second PCI, the type of the second SSB, and the frequency corresponding to the second SSB.

In a possible implementation, the communications apparatus is a CU, the second access network device may be a distributed unit DU, and the CU corresponds to at least one DU. The CU supports at least one of a protocol stack function of a packet data convergence protocol PDCP, a protocol stack function of radio resource control RRC, and a protocol stack function of a service data adaptation protocol SDAP, and the DU supports at least one of a protocol stack function of radio link control RLC, a protocol stack function of medium access control MAC, and a protocol stack function of a physical layer PHY. The transceiver 902 is specifically configured to send the indication information to the second access network device through the F1 interface.

In a possible implementation, the communications apparatus 900 is a primary node, the second access network device is a secondary node, and one primary node corresponds to at least one secondary node. The transceiver 902 is specifically configured to send the indication information to the second access network device through the Xn interface; or send the indication information to the second access network device through the X2 interface.

In a possible implementation, the processor 901 is further configured to modify the first PCI and/or the second PCI.

In another application, the apparatus may be the second access network device in any one of the foregoing embodiments, or may be a component (for example, a chip or a circuit) in the second access network device. The apparatus may perform the solutions correspondingly performed by the second access network device in FIG. 4 and FIG. 6.

The processor 901 is configured to execute the instructions stored in the memory, and control the transceiver 902 to receive and send a signal. When executing the instructions stored in the memory, the processor 901 in the communications apparatus 900 is configured to control the transceiver 902 to receive indication information from a first access network device, where the indication information is used to indicate that a first physical cell identifier PCI of a first cell conflicts with a second PCI of a second cell, the first PCI corresponds to a first SSB, and the second PCI corresponds to a second SSB. The processor 901 is configured to modify the second PCI based on the indication information.

In a possible implementation, the transceiver 902 is further configured to send, to the first access network device, SSB information corresponding to the second cell, where the SSB information corresponding to the second cell includes the second PCI, and the second cell belongs to the second access network device.

In a possible implementation, the processor 901 is configured to determine the second SSB based on the indication information, and modifies the second PCI corresponding to the second SSB.

In a possible implementation, the first access network device is a central unit CU, the communications apparatus 900 is a DU, and the CU corresponds to at least one DU. The CU supports at least one of a protocol stack function of a packet data convergence protocol PDCP, a protocol stack function of radio resource control RRC, and a protocol stack function of a service data adaptation protocol SDAP, and the DU supports at least one of a protocol stack function of radio link control RLC, a protocol stack function of medium access control MAC, and a protocol stack function of a physical layer PHY. The transceiver 902 is specifically configured to receive the indication information from the first access network device through the F1 interface.

In a possible implementation, the first access network device is a primary node, the communications apparatus 900 is a secondary node, and one primary node corresponds to at least one secondary node. The transceiver 902 is configured to receive the indication information from the first access network device through the Xn interface; or receive the indication information from the first access network device through the X2 interface.

Figure 10:
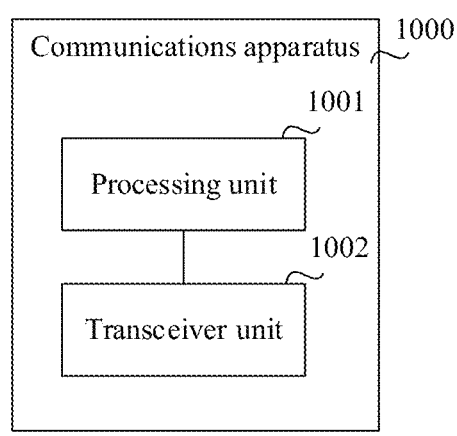
FIG. 10 is a schematic structural diagram of a communications apparatus according to this application.

Based on the foregoing content and a same concept, this application provides a communications apparatus, configured to perform any solution of the foregoing method performed by the first access network device, or configured to perform any solution of the foregoing method performed by the second access network device. FIG. 10 is a schematic structural diagram of a communications apparatus according to this application. A communications apparatus 1000 includes a processing unit 1001. Optionally, a transceiver unit 1002 may further be included. The communications apparatus 1000 in this example may be the first access network device in the foregoing content, and may perform the solutions correspondingly performed by the first access network device in FIG. 3, FIG. 4, FIG. 6, FIG. 7, and FIG. 8. The communications apparatus 1000 may alternatively be the second access network device in the foregoing content, and may perform the solutions correspondingly performed by the second access network device in FIG. 4 and FIG. 6. Alternatively, the communications apparatus 1000 may be the access network device 101 or the access network device 102 in FIG. 1, or may be the gNB 101a or the gNB 102a in FIG. 1a, or may be the LTE eNB 101b or the LTE eNB 102b in FIG. 1b, or may be the LTE eNB 101c or the NR gNB 102c in FIG. 1c, or may be the NG eNB 102d or the NR gNB 101d in FIG. 1d, or may be the DU 102e in FIG. 1e, or may be the NG eNB 101f or the NR gNB 102f in FIG. 1f.

In an application, the processing unit 1001 is configured to determine that a first physical cell identifier PCI conflicts with a second PCI, where the first PCI corresponds to a first SSB, and the second PCI corresponds to a second SSB. The transceiver unit 1002 is configured to send indication information to the second access network device and/or an OAM server, where the indication information is used to indicate that the first PCI conflicts with the second PCI.

In another application, the transceiver unit 1002 is configured to receive indication information from the first access network device, where the indication information is used to indicate that a first PCI of a first cell conflicts with a second PCI of a second cell, the first PCI corresponds to a first SSB, and the second PCI corresponds to a second SSB. The processing unit 1001 is configured to modify the second PCI based on the indication information.

It should be understood that division into units of the communications apparatus is merely logical function division. In an actual implementation, all or some of the units may be integrated into a physical entity, or may be physically separated. In this embodiment of this application, the transceiver unit 1002 may be implemented by the transceiver 902 in FIG. 9, and the processing unit 1001 may be implemented by the processor 901 in FIG. 9. In other words, in this embodiment of this application, the transceiver unit 1002 may perform the solution performed by the transceiver 902 in FIG. 9, and the processing unit 1001 may perform the solution performed by the processor 901 in FIG. 9. For other content, refer to the foregoing content. Details are not described herein again. As shown in FIG. 9, the memory 903 included in the communications apparatus 900 may be configured to store code used by the processor 901 included in the communications apparatus 900 for executing the solution, where the code may be a program/code pre-installed when the communications apparatus 1000 is delivered from a factory.

It should be noted that, for specific beneficial effects of the communications method that may be performed by the communications apparatus shown in FIG. 10, refer to related descriptions in the foregoing method embodiments. Details are not described herein again. It may be understood that the units in this embodiment of this application may also be referred to as modules. The foregoing units or modules may exist independently, or may be integrated together.

Based on the foregoing content and a same concept, this application provides a communications system. The communications system may include a first access network device and a second access network device. The first access network device is configured to determine that a first physical cell identifier PCI conflicts with a second PCI, and send indication information to the second access network device, where the indication information is used to indicate that the first PCI conflicts with the second PCI, the first PCI corresponds to a first synchronization signal and PBCH block (SSB) of the first access network device, and the second PCI corresponds to a second SSB of the second access network device. The second access network device is configured to receive the indication information from the first access network device, and modify the second PCI based on the indication information.

All or some of the foregoing embodiments may be implemented by using software, hardware, firmware, or any combination thereof. When a software program is used to implement the embodiments, all or some of the embodiments may be implemented in a form of a computer program product. The computer program product includes one or more instructions. When the computer program instructions are loaded and executed on a computer, the procedures or functions according to the embodiments of this application are all or partially generated. The computer may be a general-purpose computer, a dedicated computer, a computer network, or another programmable apparatus. The instruction may be stored in a computer storage medium or may be transmitted from a computer storage medium to another computer storage medium. For example, the instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to the computer, or a data storage device, such as a server or a data center, integrating one or more usable media. The usable medium may be a magnetic medium (for example, a floppy disk, a hard disk, a magnetic tape, or a magnetic optical disk (MO)), an optical medium (for example, a CD, a DVD, a BD, or an HVD), a semiconductor medium (for example, a ROM, an EPROM, an EEPROM, a non-volatile memory (NAND FLASH), or a solid-state drive (SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer usable storage media (including but not limited to a disk memory, a CD-ROM, an optical memory, and the like) that include computer usable program code.

The embodiments of this application are described with reference to the flowcharts and/or block diagrams of the method, the device (system), and the computer program product according to the embodiments of this application. It should be understood that instructions may be used to implement each procedure and/or each block in the flowcharts and/or the block diagrams and a combination of a procedure and/or a block in the flowcharts and/or the block diagrams. These instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These instructions may also be stored in a computer-readable memory that can indicate the computer or the other programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These instructions may be loaded into the computer or the other programmable data processing device, so that a series of operations and steps are performed on the computer or the other programmable device, to generate computer-implemented processing. Therefore, the instructions executed on the computer or the other programmable device provide steps for implementing a specified function in one or more procedures in the flowcharts and/or in one or more blocks in the block diagrams.

It is clear that a person skilled in the art can make various modifications and variations to the embodiments of this application without departing from the scope of this application. This application is intended to cover these modifications and variations of the embodiments of this application provided that they fall within the scope of protection defined by the following claims and their equivalent technologies.

What is claimed is:

1. A communications method, comprising:
determining a first physical cell identifier (PCI) of a first synchronization signal and physical broadcast channel (PBCH) block (SSB) and a second PCI of a second synchronization signal and PBCH block (SSB);
determining that the first PCI of a first cell conflicts with the second PCI of a second cell; and
sending, by a first access network device, indication information to a second access network device, wherein the indication information is used to indicate that the first PCI conflicts with the second PCI.

2. The method according to claim 1, wherein
the first cell belongs to the first access network device, and the second cell belongs to the second access network device;
both the first cell and the second cell belong to the first access network device;
both the first cell and the second cell belong to the second access network device; or
the first cell belongs to the second access network device, and the second cell belongs to a third access network device, wherein the first access network device manages the second access network device and the third access network device.

3. The method according to claim 1, wherein the method further comprises:
obtaining first SSB information corresponding to the first cell and second SSB information corresponding to the second cell, wherein the first SSB information comprises the first PCI, and the second SSB information comprises the second PCI.

4. The method according to claim 3, wherein the first SSB information comprises information of a frequency corresponding to the first SSB, and the second SSB information comprises information of a frequency corresponding to the second SSB; and
the determining that a first PCI of the first cell conflicts with a second PCI of the second cell comprises:
when it is determined that the first SSB is adjacent to the second SSB, that the frequency corresponding to the first SSB is the same as the frequency corresponding to the second SSB and that the first PCI is the same as the second PCI, determining that the first PCI conflicts with the second PCI.

5. The method according to claim 4, wherein the determining that the first SSB is adjacent to the second SSB comprises:
determining that the first SSB is directly adjacent to the second SSB; or
determining that the first SSB and the second SSB are directly adjacent to a third SSB.

6. The method according to claim 2, wherein the first access network device is a central unit (CU), the second access network device and the third access network device are distributed units (DUs), the CU corresponds to at least one DU, the CU supports at least one selected from the following: a protocol stack function of a packet data convergence protocol (PDCP), a protocol stack function of radio resource control (RRC), or a protocol stack function of a service data adaptation protocol (SDAP), and the DU supports at least one selected from the following: a protocol stack function of radio link control (RLC), a protocol stack function of medium access control (MAC), and a protocol stack function of a physical layer (PHY); and
the sending, by the first access network device, indication information to the second access network device comprises:
sending, by the first access network device, the indication information to the second access network device through an F1 interface.

7. The method according to claim 1, wherein the first access network device is a primary node, the second access network device is a secondary node, and one primary node corresponds to at least one secondary node; and
the sending, by the first access network device, indication information to the second access network device comprises:
sending, by the first access network device, the indication information to the second access network device through an Xn interface; or
sending, by the first access network device, the indication information to the second access network device through an X2 interface.

8. The method according to claim 1, wherein the method further comprises:
modifying, by the first access network device, the first PCI or the second PCI.

9. A communications apparatus, comprising a processor and a transceiver, wherein
the processor is configured to determine a first physical cell identifier (PCI) of a first synchronization signal and physical broadcast channel (PBCH) block (SSB) and a second PCI of a second SSB and determine that the first PCI of a first cell conflicts with the second PCI of a second cell; and
the transceiver is configured to send indication information to a second access network device, wherein the indication information is used to indicate that the first PCI conflicts with the second PCI.

10. The communications apparatus according to claim 9, wherein
the first cell belongs to the communications apparatus, and the second cell belongs to the second access network device;
both the first cell and the second cell belong to the communications apparatus;
both the first cell and the second cell belong to the second access network device; or
the first cell belongs to the second access network device, and the second cell belongs to a third access network device, wherein the communications apparatus manages the second access network device and the third access network device.

11. The communications apparatus according to claim 9, wherein the transceiver is further configured to:
obtain first SSB information corresponding to the first cell and second SSB information corresponding to the second cell, wherein the first SSB information comprises the first PCI, and the second SSB information comprises the second PCI.

12. The communications apparatus according to claim 11, wherein the first SSB information comprises information of a frequency corresponding to the first SSB, and the second SSB information corresponding to the second cell further comprises a frequency corresponding to the second SSB; and the processor is configured to:
when it is determined that the first SSB is adjacent to the second SSB, that the frequency corresponding to the first SSB is the same as the frequency corresponding to the second SSB, and that the first PCI is the same as the second PCI, determine that the first PCI conflicts with the second PCI.

13. The communications apparatus according to claim 12, wherein the processor is configured to:
determine that the first SSB is directly adjacent to the second SSB, or determine that the first SSB and the second SSB are directly adjacent to a third SSB.

14. The communications apparatus according to claim 10, wherein the communications apparatus is a central unit (CU), the second access network device and the third access network device are distributed units (DUs), the CU corresponds to at least one DU, the CU supports at least one protocol stack function selected from the following: a protocol stack function of a packet data convergence protocol (PDCP), a protocol stack function of radio resource control (RRC), and a protocol stack function of a service data adaptation protocol (SDAP), and the DU supports at least one protocol stack function selected from: a protocol stack function of radio link control (RLC), a protocol stack function of medium access control (MAC), or a protocol stack function of a physical layer (PHY); and
the transceiver is configured to:
send the indication information to the second access network device through an F1 interface.

15. The communications apparatus according to claim 9, wherein the communications apparatus is a primary node, the second access network device is a secondary node, and one primary node corresponds to at least one secondary node; and
the transceiver is configured to:
send the indication information to the second access network device through an Xn interface, or send the indication information to the second access network device through an X2 interface.

16. The communications apparatus according to claim 9, wherein the processor is further configured to:
modify the first PCI or the second PCI.

17. A communications apparatus, comprising a transceiver and a processor, wherein
the transceiver is configured to receive indication information from a first access network device, wherein the indication information is used to indicate that a first physical cell identifier (PCI) of a first cell conflicts with a second PCI of a second cell, the first PCI corresponds to a first synchronization signal and physical broadcast channel (PBCH) block (SSB), and the second PCI corresponds to a second SSB; and
the processor is configured to modify the second PCI based on the indication information.

18. The communications apparatus according to claim 17, wherein the transceiver is further configured to:
send, to the first access network device, SSB information corresponding to the second cell, wherein the SSB information corresponding to the second cell comprises the second PCI, and the second cell belongs to the second access network device.

19. The communications apparatus according to claim 18, wherein the processor is configured to:
determine the second SSB based on the indication information, and modify the second PCI corresponding to the second SSB.

20. The communications apparatus according to claim 17, wherein the first access network device is a central unit (CU), the communications apparatus and a third access network device are distributed units (DUs), the CU corresponds to at least one DU, the CU supports at least one protocol stack function selected from: a protocol stack function of a packet data convergence protocol (PDCP), a protocol stack function of radio resource control RRC, and a protocol stack function of a service data adaptation protocol (SDAP), and the DU supports at least one protocol stack function selected from: a protocol stack function of radio link control (RLC), a protocol stack function of medium access control (MAC), or a protocol stack function of a physical layer (PHY); and
the transceiver is configured to:
receive the indication information from the first access network device through an F1 interface.

* * * * *

UNITED STATES PATENT AND TRADEMARK OFFICE
CERTIFICATE OF CORRECTION

PATENT NO. : 12,069,520 B2
APPLICATION NO. : 17/400438
DATED : August 20, 2024
INVENTOR(S) : Xiaoli Shi et al.

It is certified that error appears in the above-identified patent and that said Letters Patent is hereby corrected as shown below:

On the Title Page

Item (57), in Column 2, in "Abstract", Line 1, delete "PCT" and insert -- PCI --.

Item (57), in Column 2, in "Abstract", Line 7, delete "PCT," and insert -- PCI, --.

Signed and Sealed this
Twenty-ninth Day of October, 2024

Katherine Kelly Vidal
*Director of the United States Patent and Trademark Office*